(12) United States Patent
Shibata

(10) Patent No.: US 11,055,263 B2
(45) Date of Patent: Jul. 6, 2021

(54) INFORMATION PROCESSING DEVICE AND INFORMATION PROCESSING SYSTEM FOR SYNCHRONIZING DATA BETWEEN STORAGE DEVICES

(71) Applicant: FUJITSU LIMITED, Kawasaki (JP)

(72) Inventor: Yoshiaki Shibata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 16/058,295

(22) Filed: Aug. 8, 2018

(65) Prior Publication Data

US 2019/0065527 A1 Feb. 28, 2019

(30) Foreign Application Priority Data

Aug. 30, 2017 (JP) .............................. JP2017-165208

(51) Int. Cl.
| | |
|---|---|
| *G06F 9/455* | (2018.01) |
| *G06F 9/46* | (2006.01) |
| *G06F 16/188* | (2019.01) |
| *G06F 9/52* | (2006.01) |
| *G06F 11/07* | (2006.01) |
| *G06F 16/178* | (2019.01) |

(52) U.S. Cl.
CPC ........ *G06F 16/188* (2019.01); *G06F 9/45533* (2013.01); *G06F 9/45558* (2013.01); *G06F 9/52* (2013.01); *G06F 11/07* (2013.01); *G06F 16/178* (2019.01); *G06F 2009/45579* (2013.01)

(58) Field of Classification Search
CPC .. G06F 16/188; G06F 16/178; G06F 9/45533; G06F 9/45558; G06F 9/52; G06F 11/07; G06F 2009/45579

USPC ............................................................ 718/1
See application file for complete search history.

(56) References Cited

U.S. PATENT DOCUMENTS 6,463,573 B1 10/2002 Maddalozzo, Jr. et al.
7,162,598 B2 1/2007 Watanabe et al.
(Continued)

FOREIGN PATENT DOCUMENTS

| JP | 2000-132343 | 5/2000 |
|---|---|---|
| JP | 2001-34426 | 2/2001 |
| JP | 2005-275537 | 10/2005 |

OTHER PUBLICATIONS

Japanese Patent Office English Abstract for Japanese Patent Publication No. 2005-275537 published Oct. 6, 2005.
(Continued)

*Primary Examiner* — Bradley A Teets
(74) *Attorney, Agent, or Firm* — Staas & Halsey LLP

(57) ABSTRACT

An information processing device according to one aspect includes a memory, a processor coupled to the memory, and one or more physical storage devices. The processor is configured to execute a configuration process of configuring a plurality of storage areas by dividing the one or more physical storage devices, a first synchronization process of initializing at least one of the storage areas and of synchronizing data stored in the initialized storage area with another information processing device, and a second synchronization process of writing file data used for generating a virtual machine to the storage area initialized and synchronized by the first synchronization process, and of synchronizing the file data written to the storage area with the another information processing device.

6 Claims, 22 Drawing Sheets

(56) References Cited

U.S. PATENT DOCUMENTS

| | | | |
|---|---|---|---|
| 8,413,145 B2* | 4/2013 | Chou | G06F 11/1484 711/112 |
| 2003/0051117 A1* | 3/2003 | Burch, Jr. | G06F 16/10 711/173 |
| 2005/0010738 A1* | 1/2005 | Stockdale | G07F 17/3202 711/170 |
| 2005/0216688 A1 | 9/2005 | Watanabe | |
| 2008/0163239 A1* | 7/2008 | Sugumar | G06F 9/5088 718/105 |

OTHER PUBLICATIONS

Japanese Patent Office English Abstract for Japanese Patent Publication No. 2001-34426 published Feb. 9, 2001.
Japanese Patent Office English Abstract for Japanese Patent Publication No. 2000-132343 published May 12, 2000.

* cited by examiner

INFORMATION PROCESSING DEVICE AND INFORMATION PROCESSING SYSTEM FOR SYNCHRONIZING DATA BETWEEN STORAGE DEVICES

CROSS-REFERENCE TO RELATED APPLICATION

This application is based upon and claims the benefit of priority of the prior Japanese Patent Application No. 2017-165208, filed on Aug. 30, 2017, the entire contents of which are incorporated herein by reference.

FIELD

The embodiments discussed herein relate to a redundancy control technique.

BACKGROUND

In a system having a redundant configuration, an active device and a standby device are provided. When the active device cannot operate properly because of, for example, occurrence of failure, the standby device takes over a task that was executed in the active device. Both the active device and the standby device have same functions, and data synchronization between the active device and the standby device is executed so that the active device and the standby device have same data.

For instance, in a system on which a virtual machine is operated, a virtual machine image that is used for operating a virtual machine is installed to physical disk devices (such as an HDD (Hard Disk Drive)) in the active device and the standby device.

Before installation of a virtual machine image, a synchronization process for initializing the physical disk devices in both the active device and the standby devices is performed. However, if a capacity of the physical disk device is large, it takes a long time to complete the synchronization process. As a result, the problem occurs in which it takes a long time to configure a system such that an operation of the system can be started. Related arts disclosed in well-known literatures are not suitable for solving the above problem.

The following is a reference document:
[Patent Document 1] Japanese Laid-Open Patent Publication No. 2005-275537,
[Patent Document 2] Japanese Laid-Open Patent Publication No. 2001-34426,
[Patent Document 3] Japanese Laid-Open Patent Publication No. 2000-132343.

SUMMARY

An information processing device according to one aspect includes a memory, a processor coupled to the memory, and one or more physical storage devices. The processor is configured to execute a configuration process of configuring a plurality of storage areas by dividing the one or more physical storage devices, a first synchronization process of initializing at least one of the storage areas and of synchronizing data stored in the initialized storage area with another information processing device, and a second synchronization process of writing file data used for generating a virtual machine to the storage area initialized and synchronized by the first synchronization process, and of synchronizing the file data written to the storage area with the another information processing device.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENT

Figure 1:
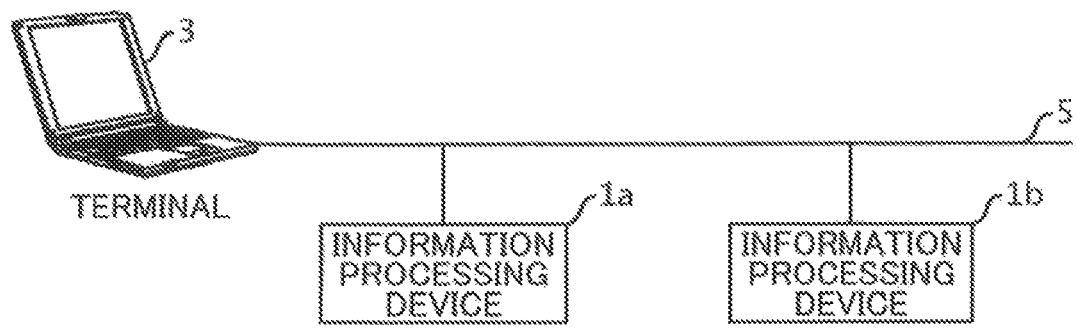
FIG. 1 is a diagram illustrating an overview of a system according to an embodiment.

FIG. 1 is a diagram illustrating an overview of a system according to an embodiment. The system adopts a redundant configuration. Specifically, an information processing device 1a and an information processing device 1b are provided. In a case in which the information processing device 1a acts as an active device, the information processing device 1b acts as a standby device. In a case in which the information processing device 1b acts as an active device, the information processing device 1a acts as a standby device. The information processing devices 1a and 1b perform communications with each other via a network 5 such as a LAN (Local Area Network). In each of the information processing devices 1a and 1b, a virtual machine is operated.

A terminal 3 is operated by a system administrator for example, which is used for sending various types of requests to the information processing devices 1a and 1b. The terminal 3 is connected to the network 5.

Figure 2:
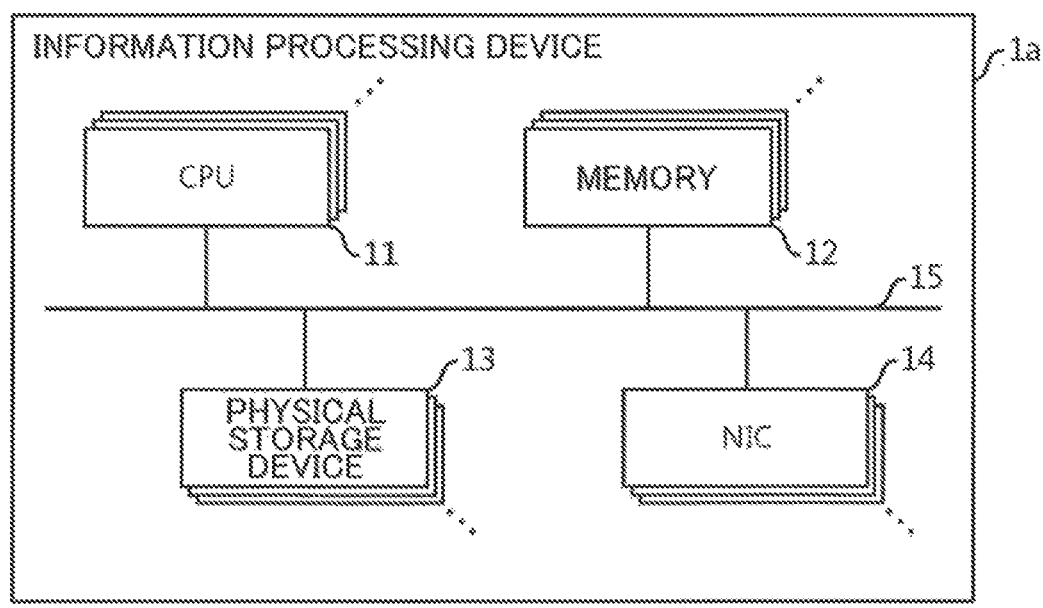
FIG. 2 is a hardware configuration diagram of an information processing device.

FIG. 2 is a hardware configuration diagram of the information processing device 1a. The information processing device 1a includes one or more CPUs (Central Processing Units) 11, one or more memories 12, one or more physical storage devices 13, and one or more NICs (Network Interface Cards) 14. The CPU 11, the memory 12, the physical storage device 13, and the NIC 14 are connected to each other via a bus 15. The physical storage device 13 is a storage device such as an HDD (Hard Disk Drive) or an SSD (Solid State Drive). The information processing device 1a may also include a hardware component other than that illustrated in FIG. 2.

Since a hardware configuration diagram of the information processing device 1b is the same as that of the information processing device 1a, a description of the hardware configuration of the information processing device 1b will be omitted.

Figure 3:
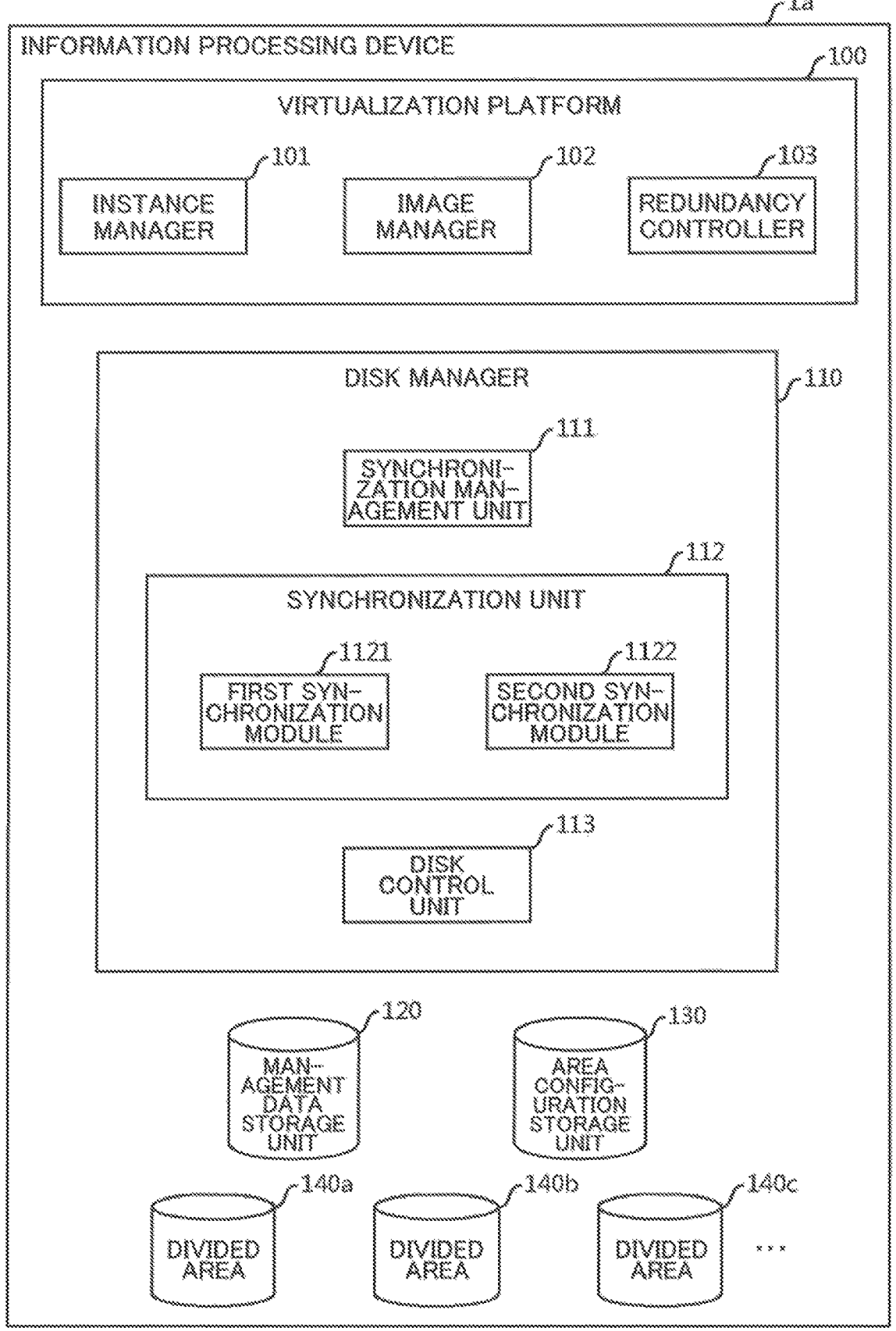
FIG. 3 is a functional block diagram of the information processing device.

FIG. 3 is a functional block diagram of the information processing device 1a. The information processing device 1a includes a virtualization platform 100, a disk manager 110, a management data storage unit 120, an area configuration storage unit 130, and divided areas 140a, 140b, and 140c. The virtualization platform 100 includes an instance manager 101, an image manager 102, and a redundancy controller 103. The disk manager 110 includes a synchronization management unit 111, a synchronization unit 112, and a disk control unit 113. The synchronization unit 112 includes a first synchronization module 1121 and a second synchronization module 1122. Although the three divided areas 140 are illustrated in FIG. 3, the number of the divided areas 140 may be more than three.

The virtualization platform 100 and the disk manager 110 are embodied, for example, by the CPU 11 executing a program loaded onto the memory 12. The management data storage unit 120 and the area configuration storage unit 130 are provided in the memory 12 or the physical storage device 13, for example. The divided areas 140a, 140b, and 140c are provided in the physical storage device 13.

The instance manager 101 manages a virtual machine image (hereinafter referred to as an "image file") applied to the information processing devices 1a and 1b. The image manager 102 controls a write operation of an image file to the physical storage device 13. The redundancy controller 103 performs redundancy control of the information processing devices 1a and 1b. The synchronization management unit 111 manages synchronization operation by the first synchronization module 1121 and the second synchronization module 1122. The first synchronization module 1121 performs synchronization for initializing the physical storage device 13 of the information processing device 1a and the physical storage device 13 of the information processing device 1b (hereinafter referred to as "initial synchronization"). The "initializing" (or initialization) means an operation for writing a predetermined value onto a region of the physical storage device 13. The second synchronization module 1122 performs a process of synchronizing data such as an image file between the information processing device 1a and the information processing device 1b. The disk control unit 113 performs processes such as a management of the divided areas 140a, 140b, and 140c defined in the physical storage device 13.

Figure 4:
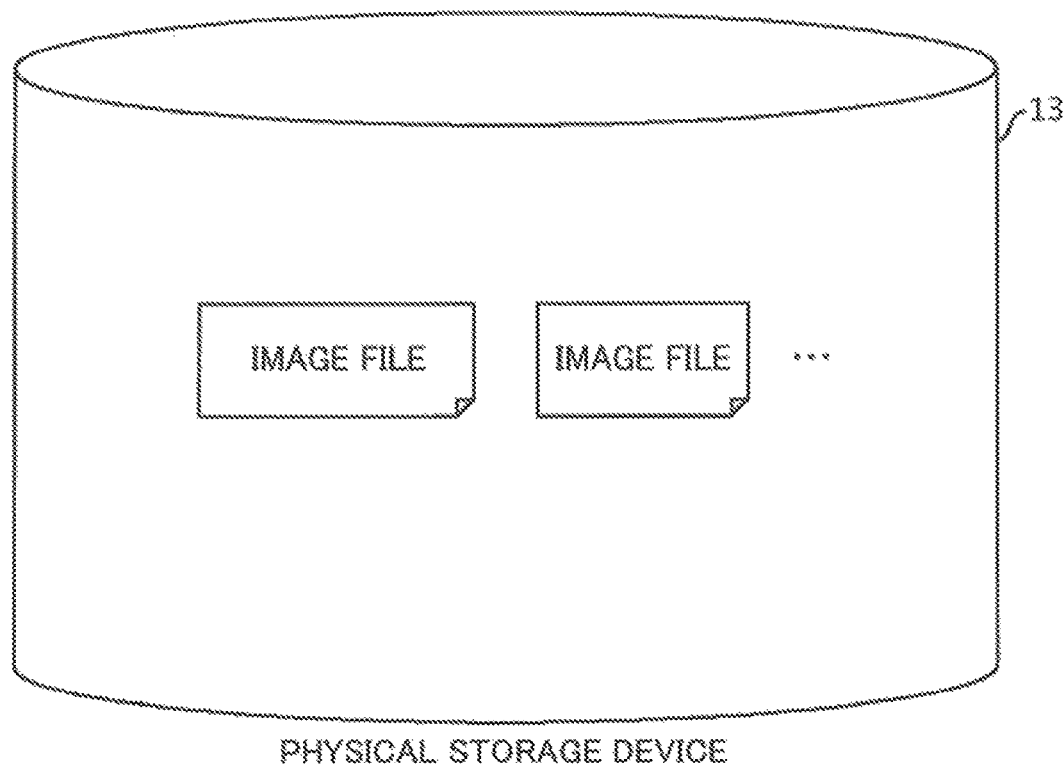
FIG. 4 and FIG. 5 are diagrams illustrating a method of storing an image file into a physical storage device.

Next, a method of storing an image file into the physical storage device 13 will be described with reference to FIG. 4 and FIG. 5. FIG. 4 is a diagram illustrating a conventional storing method. In the conventional storing method, after an entire region of the physical storage device 13 is initialized, one or more image files are stored, as illustrated in FIG. 4. Because the initialization is made to the entire region of the physical storage device 13 even though the region of the physical storage device 13 includes an unused area where an image file is not stored, it may take a long time to complete the initialization.

Figure 5:
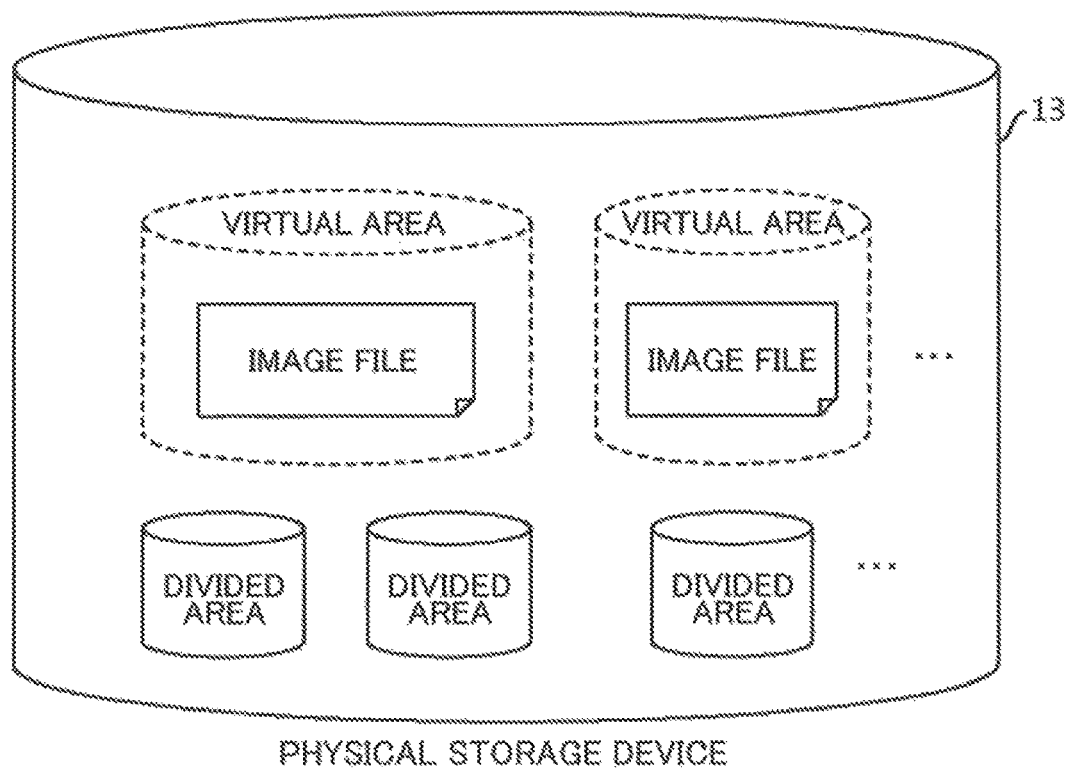

FIG. 5 is a diagram illustrating a storing method according to the present embodiment. In the present embodiment, when the physical storage device 13 is to be used, the physical storage device 13 is divided into multiple divided areas (such as partitions). In the example illustrated in FIG. 5, the physical storage device 13 is divided into at least three divided areas. Also, FIG. 5 illustrates a case, in which one image file is stored in a virtual area consisting of two divided areas, and the other image file is stored in another virtual area consisting of one divided area. Note that the virtual area is a type of logical region. By using a region of the physical storage device 13 after dividing the region into multiple divided areas as described above, if only a divided area storing an image file is initialized (such as initial synchronization and an image file synchronization) at the time of starting an operation, other divided areas are not required to be initialized at the time of starting an operation.

Next, processes performed in the system according to the present embodiment will be described with reference to FIGS. 6 to 23.

Figure 6:
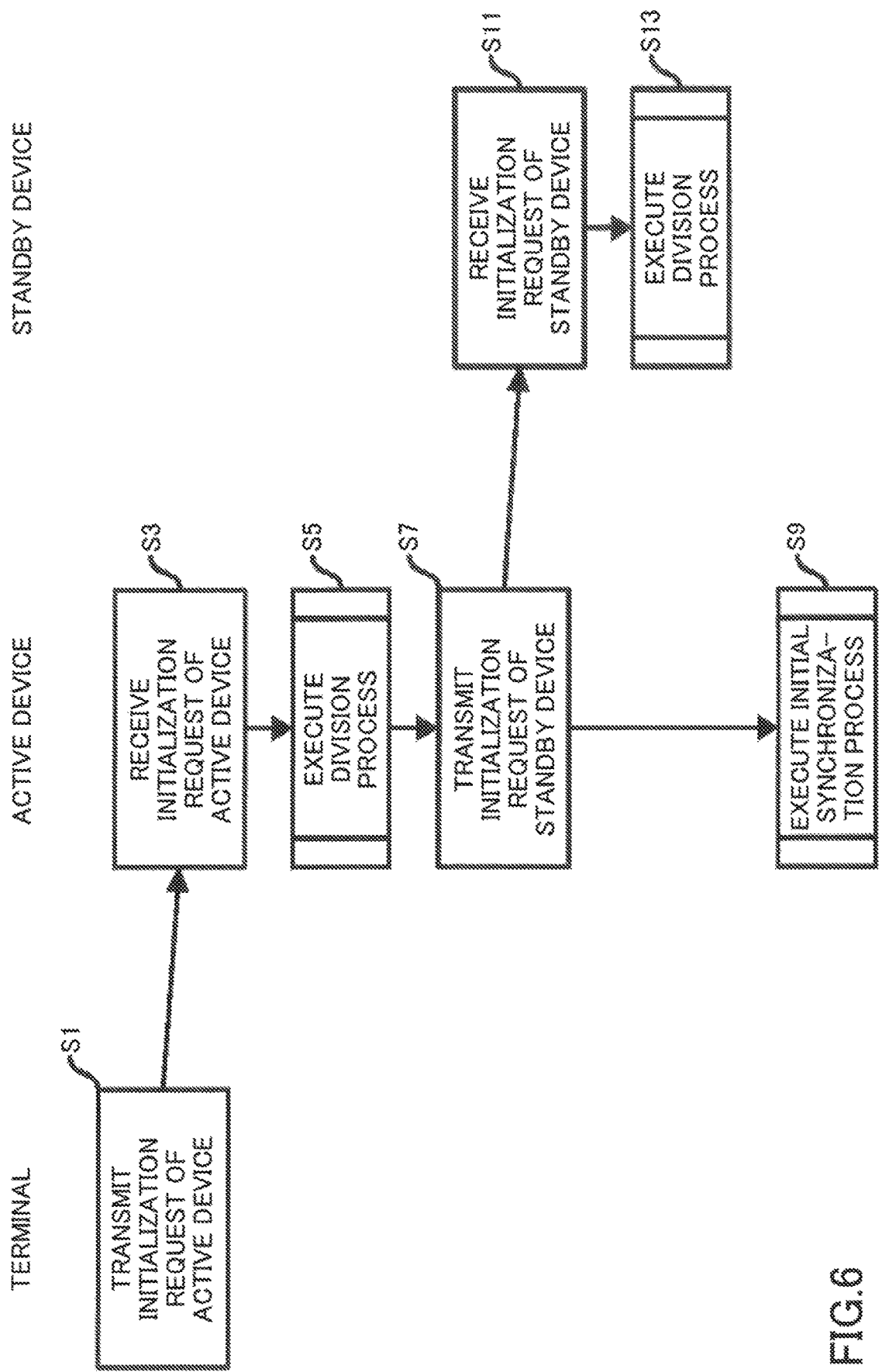
FIG. 6 is a flowchart illustrating a flow of a process performed at an initialization of an active device and a standby device.

FIG. 6 is a flowchart illustrating a flow of a process performed at an initialization of an active device and a standby device. Let the information processing device 1a be an active device, and let the information processing device 1b be a standby device.

In response to an input from, for example, a system administrator, the terminal 3 transmits an initialization request of the active device to the active device (FIG. 6: step S1).

The disk control unit 113 in the active device receives the initialization request of the active device from the terminal 3 (step S3), and executes (calls) a division process (step S5).

Figure 7:
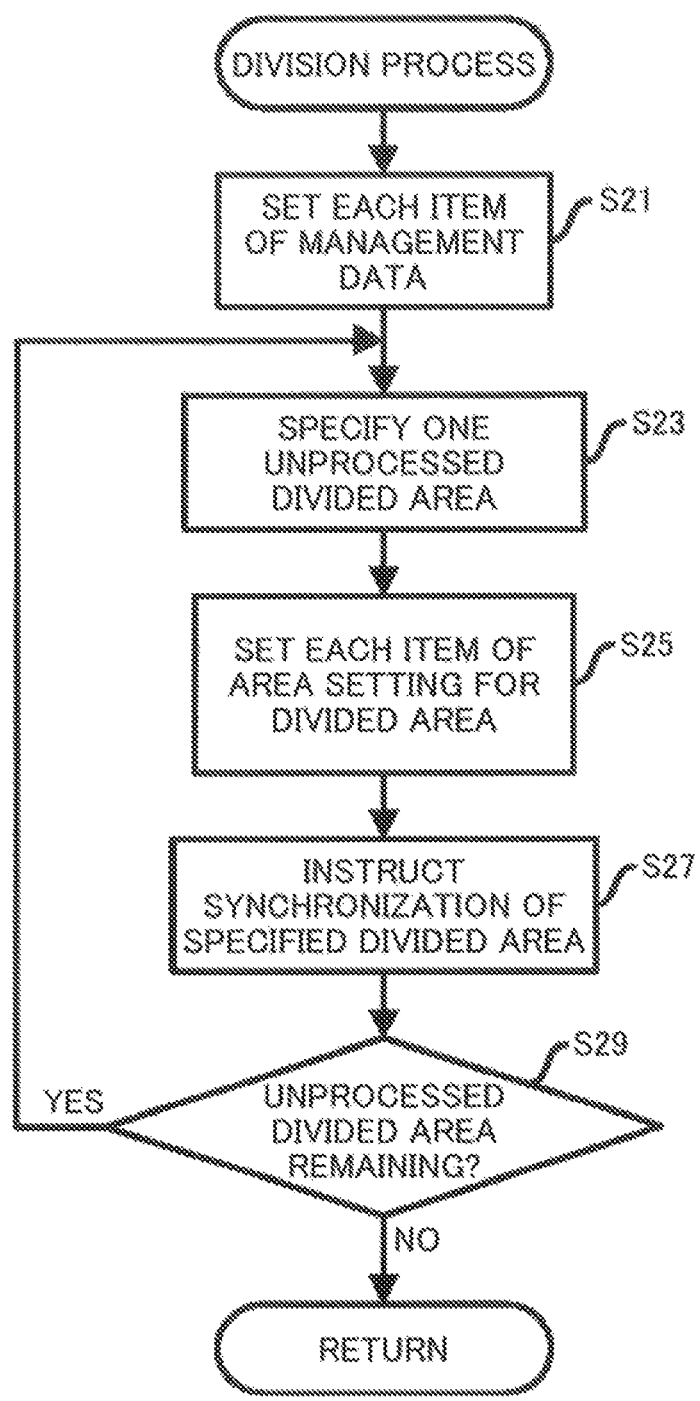
FIG. 7 is a flowchart illustrating a flow of a division process.

FIG. 7 is a flowchart illustrating a flow of the division process.

The disk control unit 113 sets each item of management data stored in the management data storage unit 120. The management data includes an item of identification information of the physical storage device 13 to be divided (such as a name of the physical storage device 13), an item of the number of divided areas, and an item of a size of the divided area. The management data also includes, for each divided area, an item of information used for an access to the divided area from the information processing device having the divided area, and an item of a status of the divided area. The status can take one of the following 4 values: "Free", "Init", "Sync", and "Used". "Free" represents a state in which the divided area is not used (that is, an image file is not stored), "Init" represents a state in which initial synchronization is being executed with respect to the divided area, "Sync" represents a state in which initial synchronization with respect to the divided area is completed, and "Used" represents a state in which the divided area is in use. Each item may be set in accordance with information included in the initialization request (such as information designated by the system administrator), or may be set based on information stored in the active device in advance. At an initial state, the status of each divided area is set to "Free".

The disk control unit 113 instructs the synchronization management unit 111 to divide a region of the physical storage device 13 into divided areas. In response to the instruction, the synchronization management unit 111 specifies one divided area to which the following process (step S25, and step S27) has not been applied, based on the management data stored in the management data storage unit 120 (step S23). During the description of the division process, the divided area to which the following process (step S25, and step S27) has not been applied is referred to as an "unprocessed divided area".

With respect to the divided area specified at step S23, the synchronization management unit 111 sets each item of an area setting stored in the area configuration storage unit 130 (step S25). The area setting includes an item of the identification information of the physical storage device 13 to be divided (such as a name of the physical storage device 13), an item of information used for an access to the divided area from the information processing device having the divided area, and an item of communication information used when a divided area owned by a certain information processing device is accessed by another information processing device corresponding to the certain information processing device.

The synchronization management unit 111 instructs the synchronization unit 112 to synchronize the divided area specified at step S23 (step S27).

The synchronization management unit 111 checks if an unprocessed divided area still remains (step S29). If such a divided area remains (step S29: YES), the process reverts to step S23.

If an unprocessed divided area is not present (step S29: NO), the process returns to the process of a caller (which is the step that has called the division process, such as step S5).

By performing the above process, one or more physical storage devices 13 can be used as multiple divided areas.

Referring back to FIG. 6, the disk control unit 113 in the active device transmits an initialization request of the standby device to the standby device (step S7).

The disk control unit 113 in the standby device receives the initialization request of the standby device from the active device (step S11). The initialization request transmitted at step S11 contains management data stored in the management data storage unit 120 of the active device.

The disk control unit 113 in the standby device executes the division process in accordance with the management data contained in the initialization request (step S13). Since the division process performed at step S13 is similar to the above described process, detailed description of the division process is omitted. By performing step S13, the standby device can configure multiple divided areas, similarly to the active device.

The disk control unit 113 in the active device executes an initial synchronization process (step S9).

Figure 8:
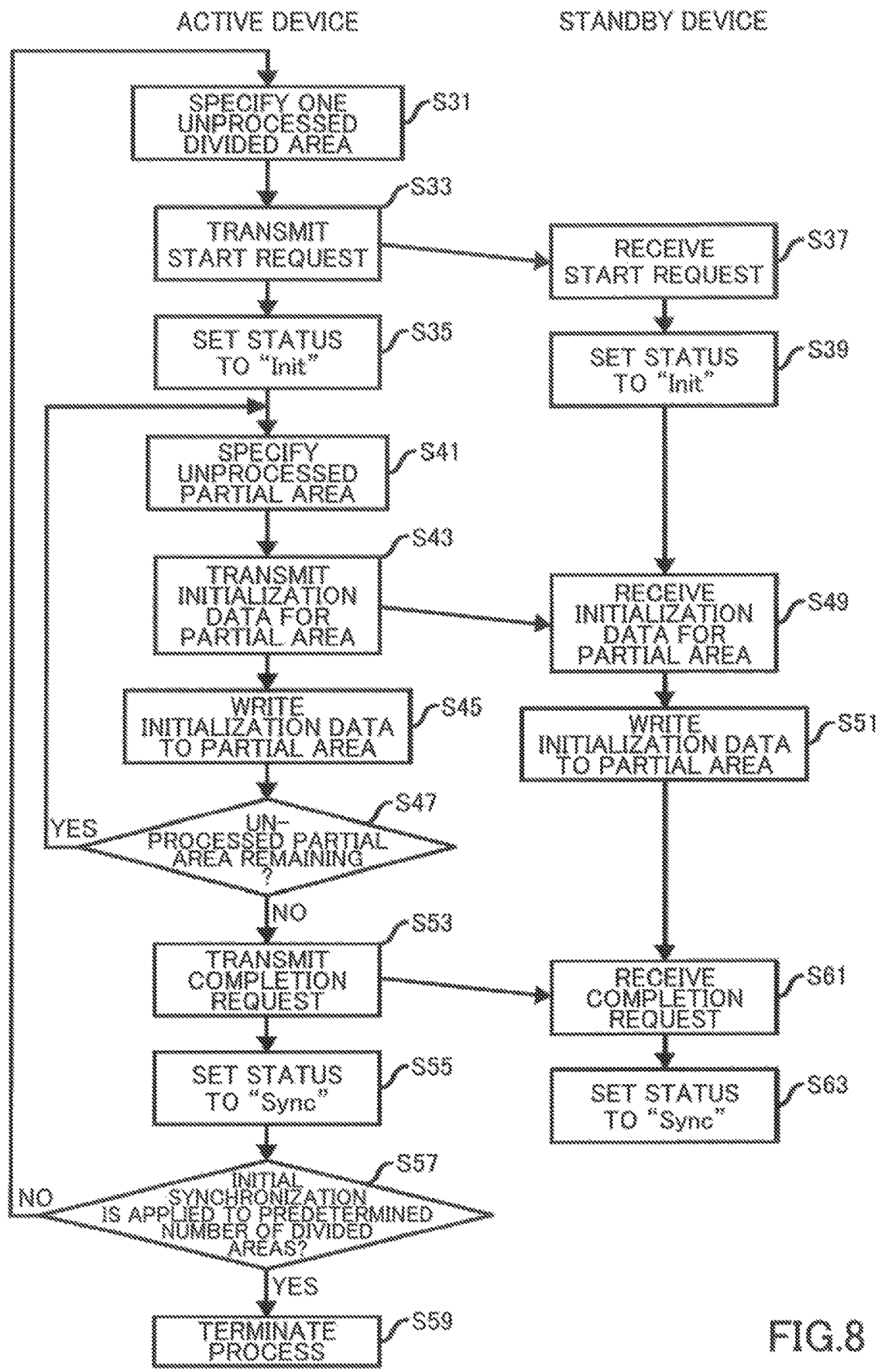
FIG. 8 is a flowchart illustrating a flow of an initial synchronization process.

FIG. 8 is a flowchart illustrating a flow of the initial synchronization process.

The disk control unit 113 in the active device instructs the synchronization management unit 111 in the active device to perform initial synchronization. In response to the instruction, the synchronization management unit 111 specifies one divided area to which the following process has not been applied (step S31). During the description of the initial synchronization process, a divided area to which the following process (step S33 and thereafter) has not been applied is referred to as an "unprocessed divided area".

The synchronization management unit 111 in the active device transmits a start request of initial synchronization of the divided area specified at step S31 (step S33). The synchronization management unit 111 in the active device sets a status of the divided area specified at step S31 to "Init" (step S35).

The synchronization management unit 111 in the standby device receives the start request of the initial synchronization of the divided area specified at step S31 (step S37). The synchronization management unit 111 in the standby device sets a status of a divided area, which corresponds to the divided area specified at step S31, to "Init" (step S39).

The synchronization management unit 111 in the active device instructs the first synchronization module 1121 in the active device to perform the initial synchronization. In response to the instruction, the first synchronization module 1121 in the active device specifies, from the divided area specified at step S31, a partial area to which the following process has not been applied (unprocessed partial area) (step S41). In the present embodiment, the partial area means an area having a predetermined size smaller than a size of a divided area.

The first synchronization module 1121 in the active device transmits initialization data (data to be written to an area in "Init" state for initialization) for the partial area specified at step S41, to the first synchronization module 1121 in the standby device (step S43).

The first synchronization module 1121 in the active device writes the initialization data to the partial area specified at step S41 (step S45). Note that step S45 may be executed prior to step S43.

The first synchronization module 1121 in the active device determines if an unprocessed partial area still remains (step S47). If an unprocessed partial area remains (step S47: YES), the process reverts to step S41. If an unprocessed partial area is not present (step S47: NO), the process proceeds to step S53.

The first synchronization module 1121 in the standby device receives the initialization data for the partial area specified at step S41 from the first synchronization module 1121 in the active device (step S49).

The first synchronization module 1121 in the standby device writes the initialization data to a partial area corresponding to the partial area specified at step S41 (step S51).

The synchronization management unit 111 in the active device transmits a completion request of the initial synchronization with respect to the divided area specified at step S31, to the synchronization management unit 111 in the standby device (step S53).

The synchronization management unit 111 in the active device sets the status of the divided area specified at step S31 to "Sync" (step S55).

The synchronization management unit 111 in the active device determines if the initial synchronization process is applied to a predetermined number of the divided areas (step S57). The predetermined number at step S57 is less than the number of the divided areas, and may be preconfigured such that a size of the predetermined number of the divided areas (predetermined number×a size of a divided area) is larger than a size of the image file.

If the initial synchronization process has not been applied to the predetermined number of the divided areas (step S57: NO), the process reverts to step S31. If the initial synchronization process is applied to the predetermined number of the divided areas (step S57: YES), the synchronization management unit 111 terminates the process (step S59).

The synchronization management unit 111 in the standby device receives the completion request of the initial synchronization with respect to the divided area specified at step S31, from the active device (step S61).

The synchronization management unit 111 in the standby device sets the status of the divided area corresponding to the divided area specified at step S31 to "Sync" (step S63).

By performing the above process, the initial synchronization can be made to only a part of the divided areas, not all the divided areas.

Figure 9:
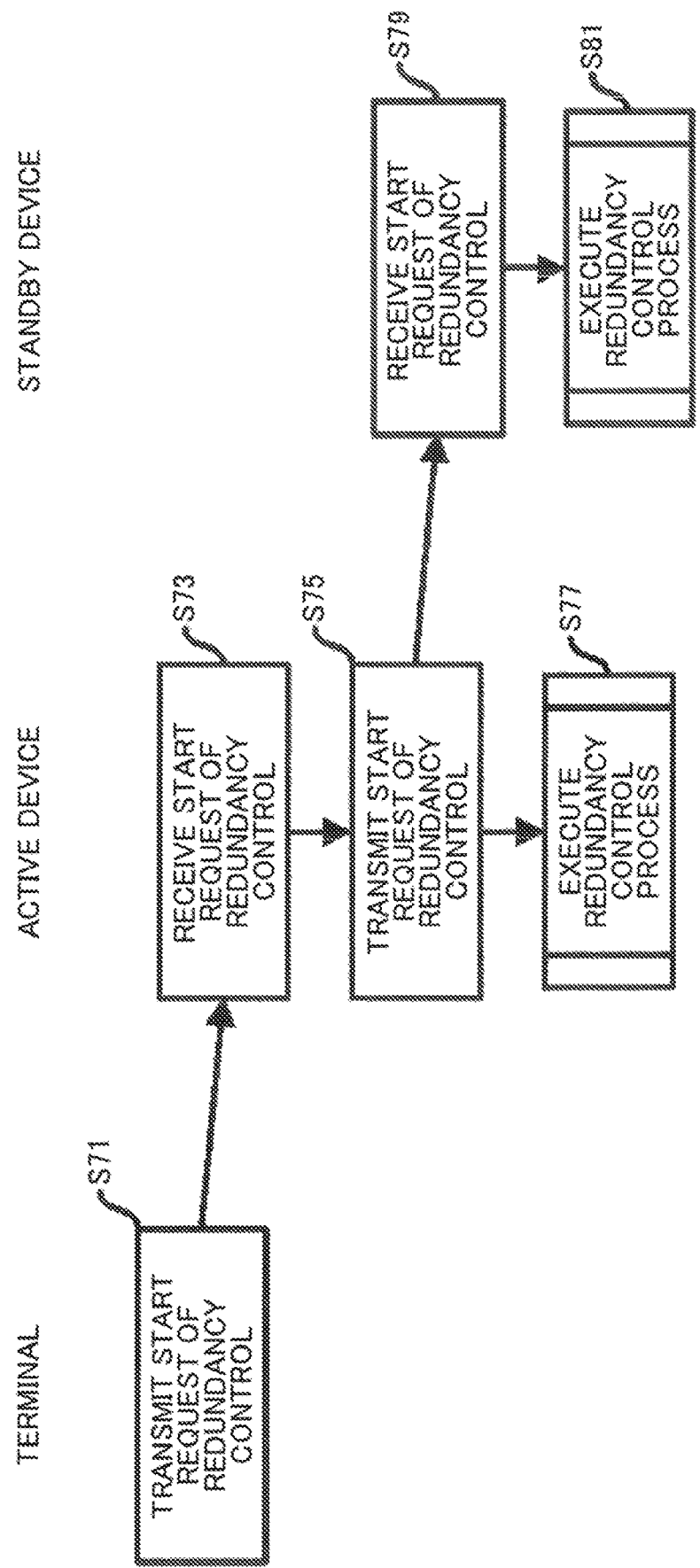
FIG. 9 is a flowchart illustrating a flow of a process performed when a redundancy control is started.

FIG. 9 is a flowchart illustrating a flow of a process performed when a redundancy control is started. Let the information processing device 1a be an active device, and let the information processing device 1b be a standby device.

In response to an input from, for example, the system administrator, the terminal 3 transmits a start request of the redundancy control to the active device (FIG. 9: step S71).

The redundancy controller 103 in the active device receives the start request of the redundancy control from the terminal 3 (step S73). The redundancy controller 103 in the active device transmits the start request of the redundancy control to the standby device (step S75), and the redundancy controller 103 in the standby device receives the start request of the redundancy control from the terminal 3 (step S79).

The disk control unit 113 in the active device executes (calls) a redundancy control process, in response to the request from the redundancy controller 103 in the active device (step S77). The disk control unit 113 in the standby device executes (calls) the redundancy control process, in response to the request from the redundancy controller 103 in the standby device (step S81).

Figure 10:
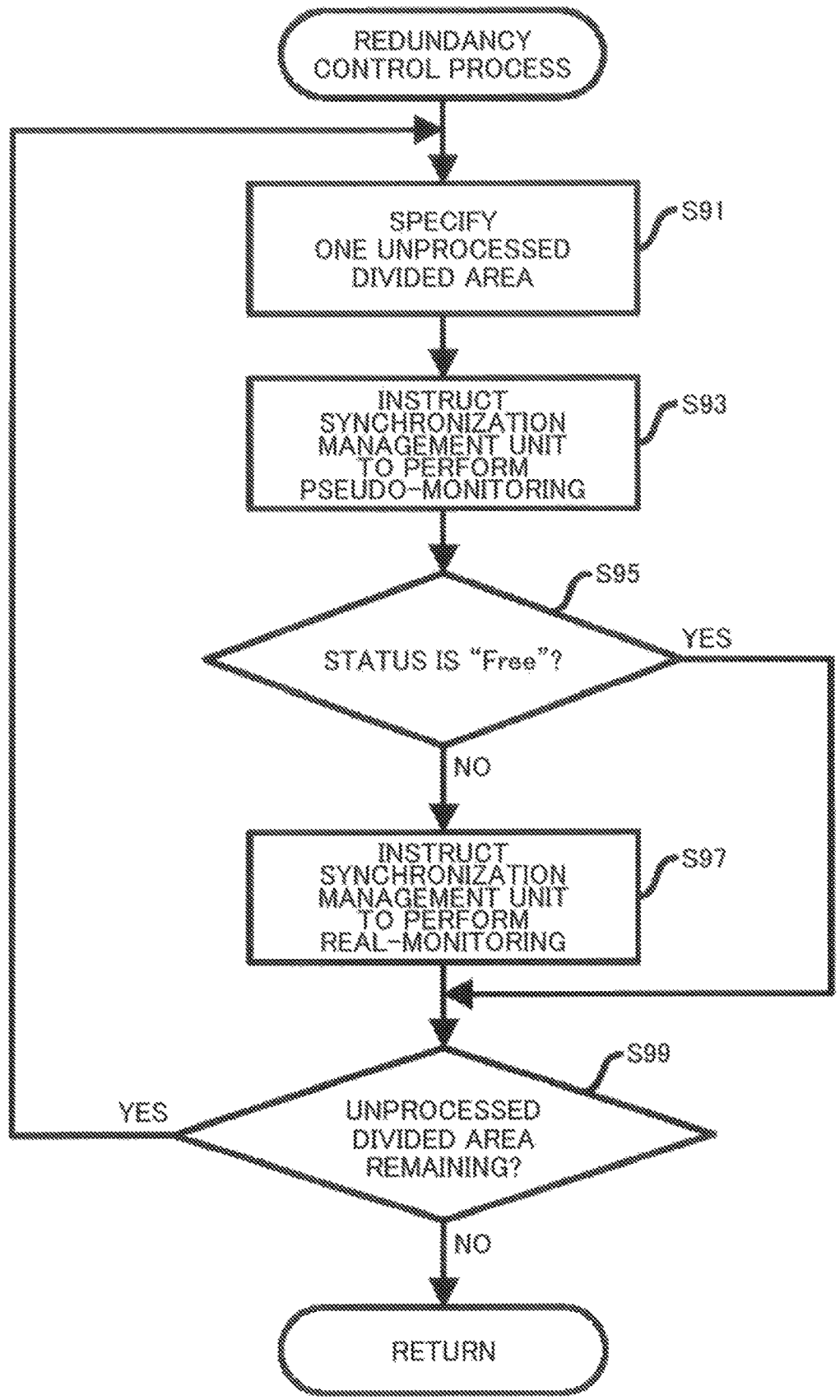
FIG. 10 is a flowchart illustrating a process flow of a redundancy control process.

FIG. 10 is a flowchart illustrating a process flow of the redundancy control process.

The disk control unit 113 specifies one divided area to which the following process (step S93 and thereafter) has not been applied (step S91). During the description of the redundancy control process, a divided area to which the following process (step S93 and thereafter) has not been applied is referred to as an "unprocessed divided area".

The disk control unit 113 instructs the synchronization management unit 111 to perform pseudo-monitoring of the divided area specified at step S91 (step S93). By performing this step, the synchronization management unit 111 is able to indicate to a process or the like, for monitoring whether or not a divided area is synchronized appropriately, that no synchronization problem is present in the divided area, even for a divided area that has not been initialized. Accordingly, even in a case in which the initial synchronization is made to only a part of the divided areas, the system can operate normally.

The disk control unit 113 determines if the divided area specified at step S91 is in a "Free" state (step S95).

If the divided area specified at step S91 is in a "Free" state (step S95: YES), the process proceeds to step S99. If the divided area specified at step S91 is not in a "Free" state (step S95: NO), the disk control unit 113 instructs the synchronization management unit 111 to perform real-monitoring of the divided area specified at step S91 (step S97). By performing this step, the synchronization management unit 111 will manage a synchronization state of the divided area specified at step S91 normally.

The disk control unit 113 determines if an unprocessed divided area is still present (step S99). If an unprocessed divided area remains (step S99: YES), the process reverts to step S91. If an unprocessed partial area is not present (step S99: NO), the process returns to a process of a caller (such as step S77).

By performing the above process, the redundancy control process can be started in the system.

Figure 11:
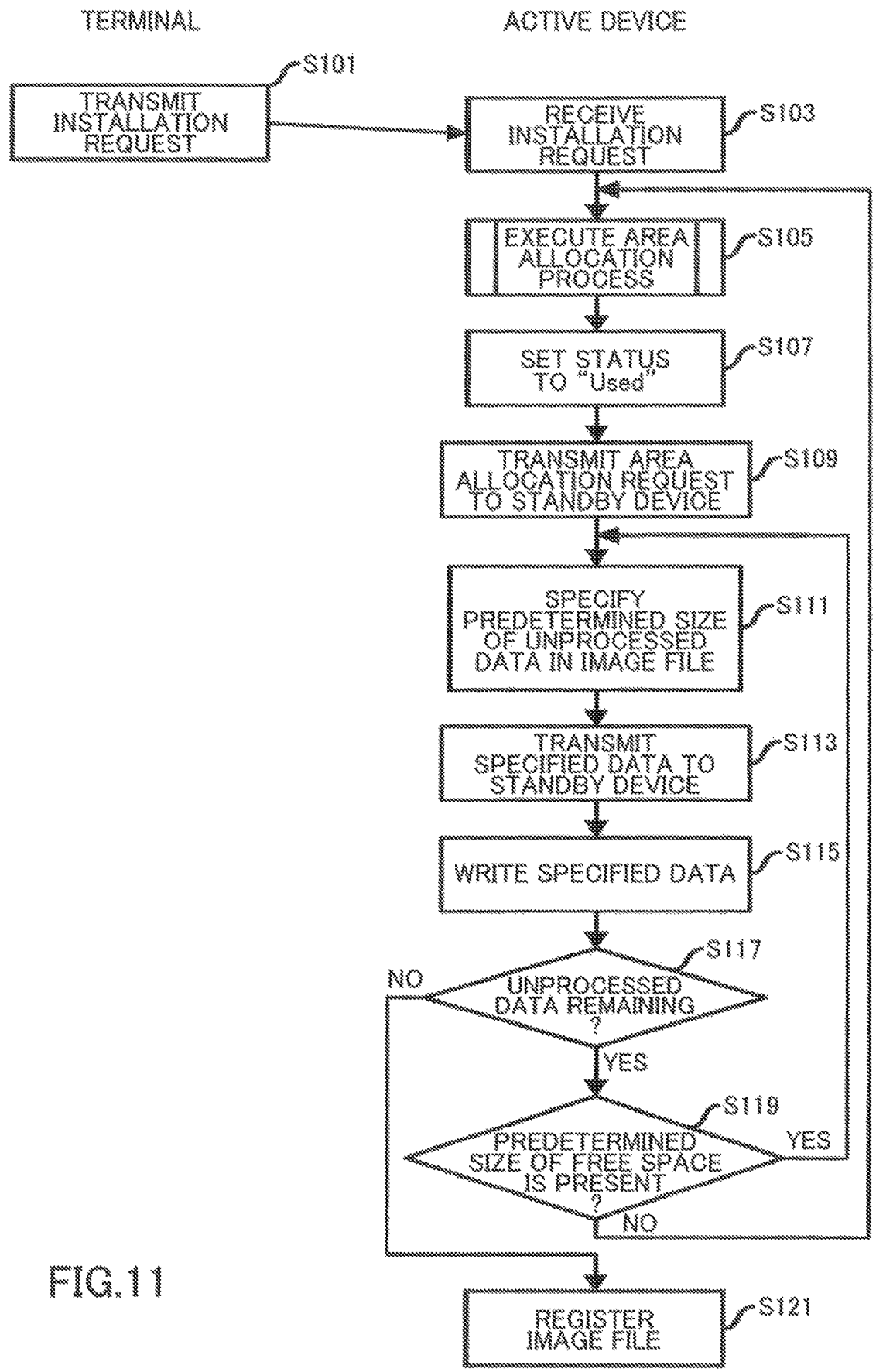
FIG. 11 is a flowchart illustrating a flow of a process performed when an image file is installed.

FIG. 11 is a flowchart illustrating a flow of a process performed when an image file is installed. Let the information processing device 1a be an active device, and let the information processing device 1b be a standby device. Note that each functional block such as the image manager 102, the disk control unit 113, the first synchronization module 1121, the second synchronization module 1122, and the instance manager 101, mentioned in the following description of FIG. 11, refers to a functional block in the active device, unless otherwise stated.

In response to an input from, for example, the system administrator, the terminal 3 transmits an installation request of an image file to the active device (FIG. 11: step S101).

The image manager 102 in the active device receives the installation request from the terminal 3 (step S103). Note that the image file to be written to the divided area may be installed from a removable disk or the like, for example. Also, more than one image file may be written to the divided area.

The image manager 102 instructs the disk control unit 113 to install the image file. In response to the instruction, the disk control unit 113 executes (calls) an area allocation process (step S105).

Figure 12:
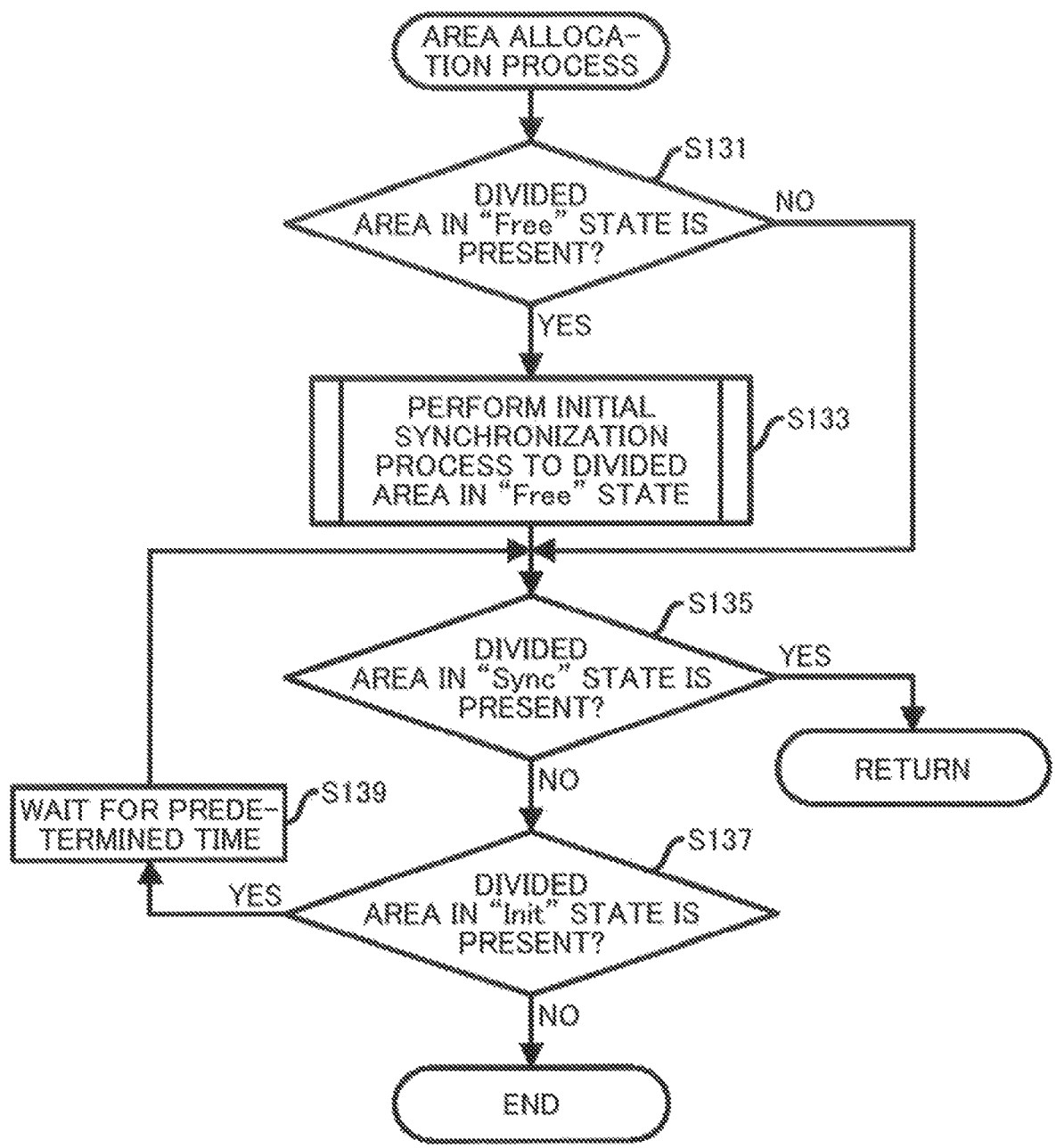
FIG. 12 is a flowchart illustrating a process flow of an area allocation process.

FIG. 12 is a flowchart illustrating a process flow of the area allocation process.

The disk control unit 113 determines if a divided area in a "Free" state is present (FIG. 12: step S131).

If a divided area in a "Free" state is not present (step S131: NO), the process proceeds to step S135.

If a divided area in a "Free" state is present (step S131: YES), the disk control unit 113 instructs the synchronization management unit 111 to perform the initial synchronization process with respect to the divided area in the "Free" state (step S133). Subsequently, the operation proceeds to step S135. By performing the above step, the area allocation process by the disk control unit 113, a write of the image file by the second synchronization module 1122 (to be described below), and the initial synchronization process by the synchronization management unit 111 can be executed in parallel.

The disk control unit 113 determines if a divided area in a "Sync" state is present (step S135). If a divided area in a "Sync" state is found (step S135: YES), the divided area (in the "Sync" state) can be allocated. Therefore, in this case, the divided area which was found at step S135 is allocated, and the process returns to a process of a caller (such as step S105).

If a divided area in a "Sync" state is not found (step S135: NO), the disk control unit 113 determines if a divided area in an "Init" state is present (step S137).

If a divided area in an "Init" state is present (step S137: YES), the disk control unit 113 waits for a predetermined time (step S139), and the process reverts to step S135. If a divided area in an "Init" state is not present (step S137: NO), the process terminates.

Referring back to FIG. 11, the disk control unit 113 sets the status of the allocated divided area (the divided area in the "Sync" state which was found at step S135) to "Used" (step S107).

The disk control unit 113 transmits a request (area allocation request) for allocating a divided area to the standby device (step S109). In response to a receipt of the request for allocating a divided area, the disk control unit 113 in the standby device performs the area allocation process (step S105). The area allocation process performed in the standby device is similar to that in the active device, and the status of a divided area allocated by the area allocation process performed in the standby device is set to "Used".

The image manager 102 instructs the second synchronization module 1122 to write the image file. In response to the instruction, the second synchronization module 1122 specifies a predetermined size of data to which the following operations (steps S113 and S115) have not been applied, from among data in the image file (step S111). The predetermined size mentioned here may be the same as the size of the above mentioned partial area, for example. Note that, during the description of FIG. 11, the data (in the image file) to which the following operations (steps S113 and S115) have not been applied is referred to as "unprocessed data".

The second synchronization module 1122 transmits the data specified at step S111 to the standby device (step S113). In response to the data transmission, the second synchronization module 1122 in the standby device writes the data transmitted from the active device into the divided area which was allocated by the disk control unit 113 in the standby device when step S109 was executed.

The second synchronization module 1122 writes the data specified at step S111 into the divided area whose status has been set to "Used" at step S107 (step S115). At this time, the initial synchronization process may be being executed by the first synchronization module 1121. In the present embodiment, because a write operation of an image file and initial synchronization can be executed in parallel, it is not necessary to provide time for executing only the initial synchronization.

The second synchronization module 1122 determines if unprocessed data is still present in the image file (step S117).

If unprocessed data is not present (step S117: NO), the instance manager 101 registers the image file which was written by performing the process described here at this time, as an image file applied to the active device and the standby device (step S121).

If unprocessed data is found (step S117: YES), the second synchronization module 1122 determines if there is a predetermined size of free space in the divided area allocated at step S105 (step S119).

If a predetermined size of free space is not present (step S119: NO), the process reverts to step S105. If a predetermined size of free space is present (step S119: YES), the process reverts to step S111.

By performing the above operation, while allocating a divided area and writing an image file, the initial synchronization process can be executed in parallel. Accordingly, occurrence of a case, in which a time for executing initial synchronization must be provided due to insufficiency of divided areas to which the initial synchronization process has been applied, can be avoided.

FIGS. 13 to 18 are diagrams illustrating a state when a process for writing an image file and the initial synchronization process are executed in parallel.

Figure 13:
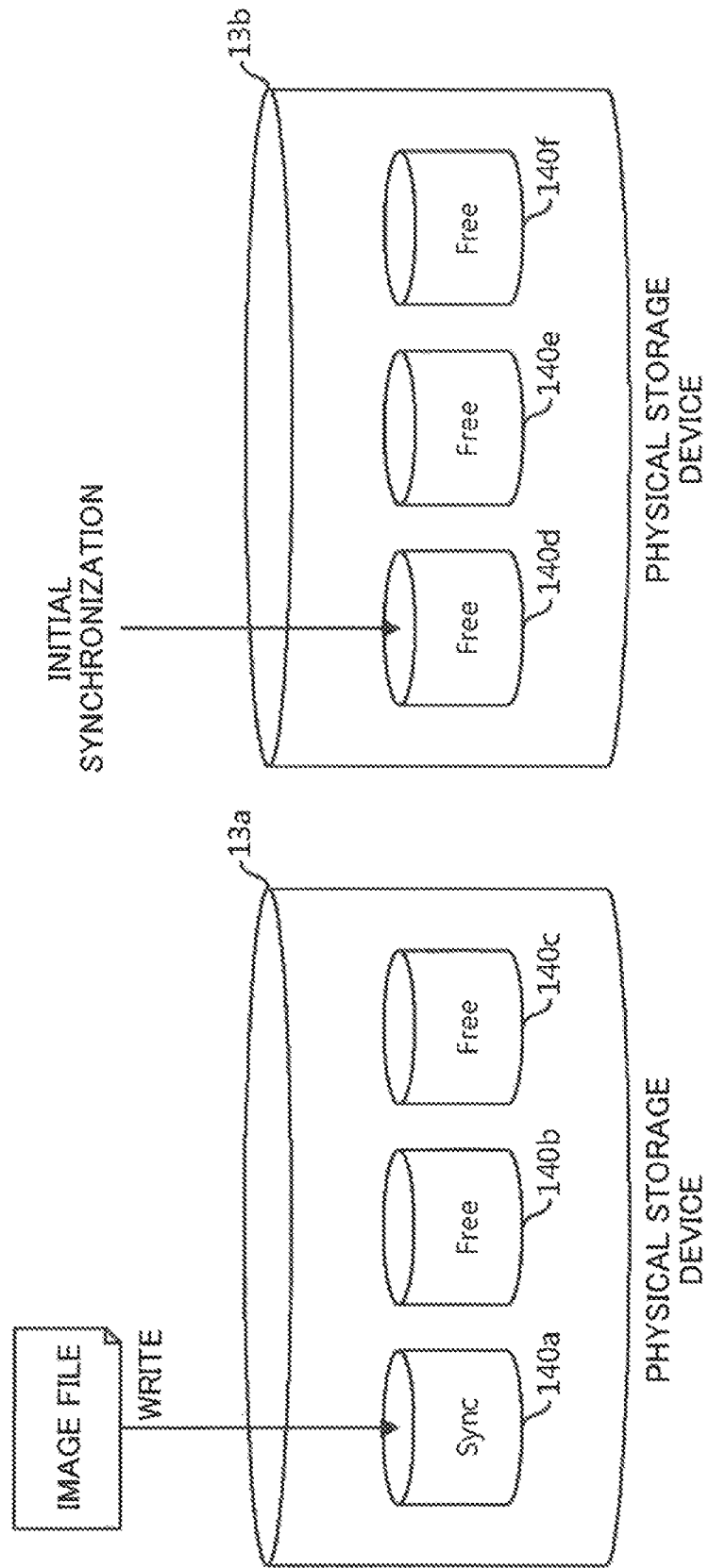
FIGS. 13 to 18 are diagrams illustrating a state when a process for writing the image file and the initial synchronization process are executed in parallel.

Suppose a case in which the divided areas 140a, 140b, and 140c are defined in a physical storage device 13a, and in which the divided areas 140d, 140e, and 140f are defined in a physical storage device 13b, as illustrated in FIG. 13. In FIG. 13, the statuses of the divided areas 140a, 140b, 140c, 140d, 140e, and 140f are respectively "Sync", "Free", "Free", "Free", "Free", and "Free". In this case, as the divided area 140a is in the "Sync" state, the divided area 140a is allocated for storing an image file, and the image file is written to the divided area 140a. In parallel with the operation, the initial synchronization process is performed to the divided area 140d in the physical storage device 13b which is different from the physical storage device 13a to which the image file is being written. As described above, by using multiple physical storage devices, parallel processing is realized.

Figure 14:
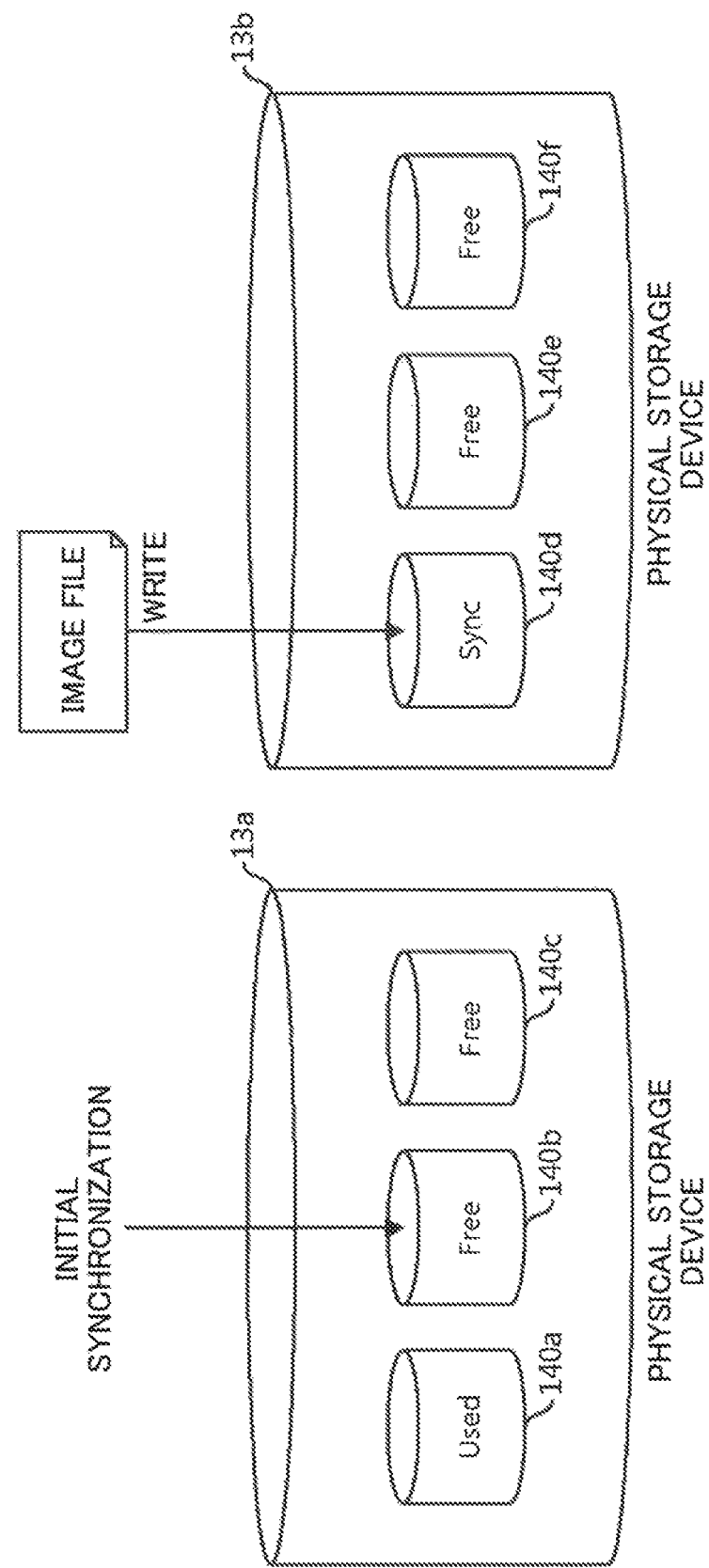

Subsequently, the statuses of the divided areas change, as illustrated in FIG. 14. In FIG. 14, the statuses of the divided areas 140a, 140b, 140c, 140d, 140e, and 140f are respectively "Used", "Free", "Free", "Sync", "Free", and "Free". In this case, the divided area 140d in the "Sync" state is allocated for storing an image file, and the image file is written to the divided area 140d. In parallel with the operation, the initial synchronization process is performed to the divided area 140b in the physical storage device 13a which is different from the physical storage device 13b to which the image file is being written.

Figure 15:
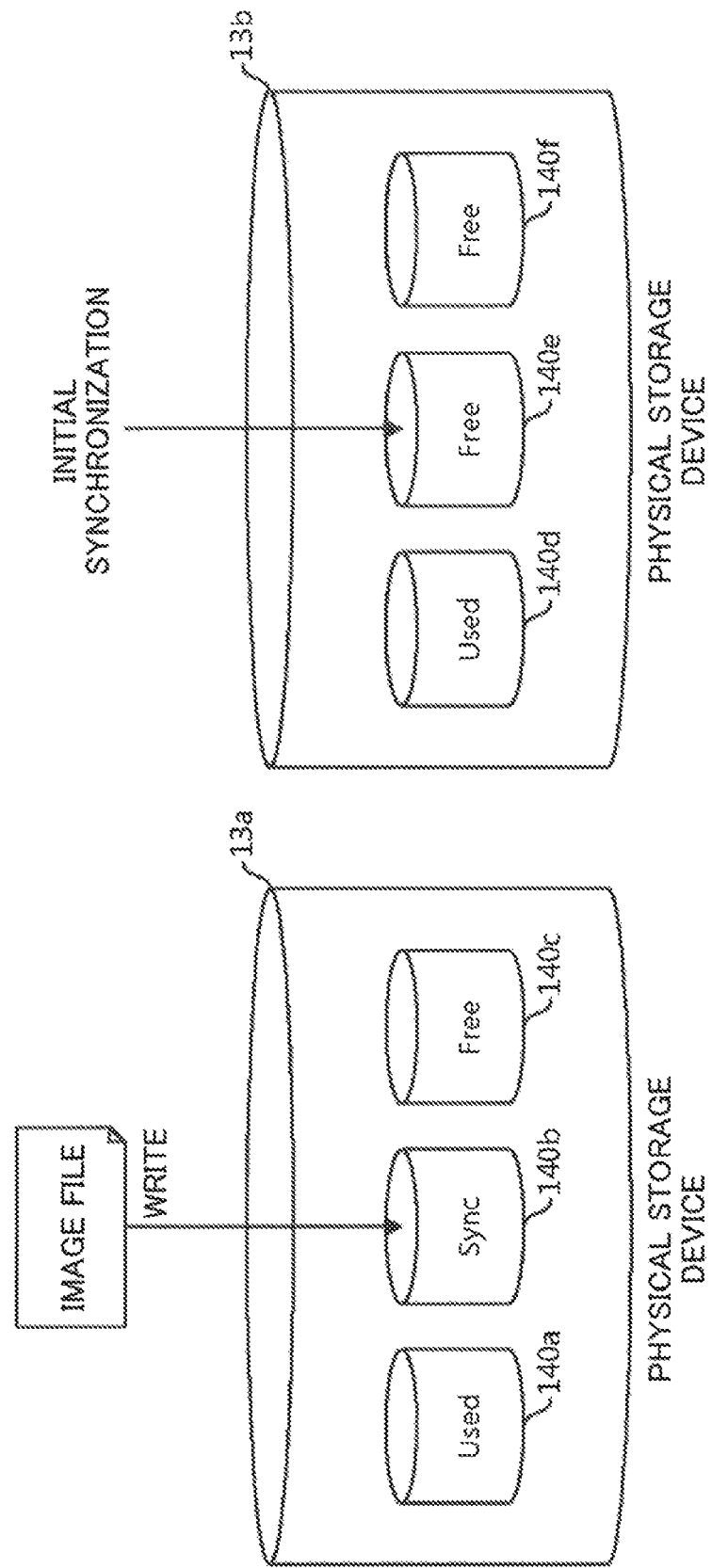

Subsequently, the statuses of the divided areas change, as illustrated in FIG. 15. In FIG. 15, the statuses of the divided areas 140a, 140b, 140c, 140d, 140e, and 140f are respectively "Used", "Sync", "Free", "Used", "Free", and "Free". In this case, the divided area 140b in the "Sync" state is allocated for storing an image file, and the image file is written to the divided area 140b. In parallel with the operation, the initial synchronization process is performed to the divided area 140e in the physical storage device 13b which is different from the physical storage device 13a to which the image file is being written.

Figure 16:
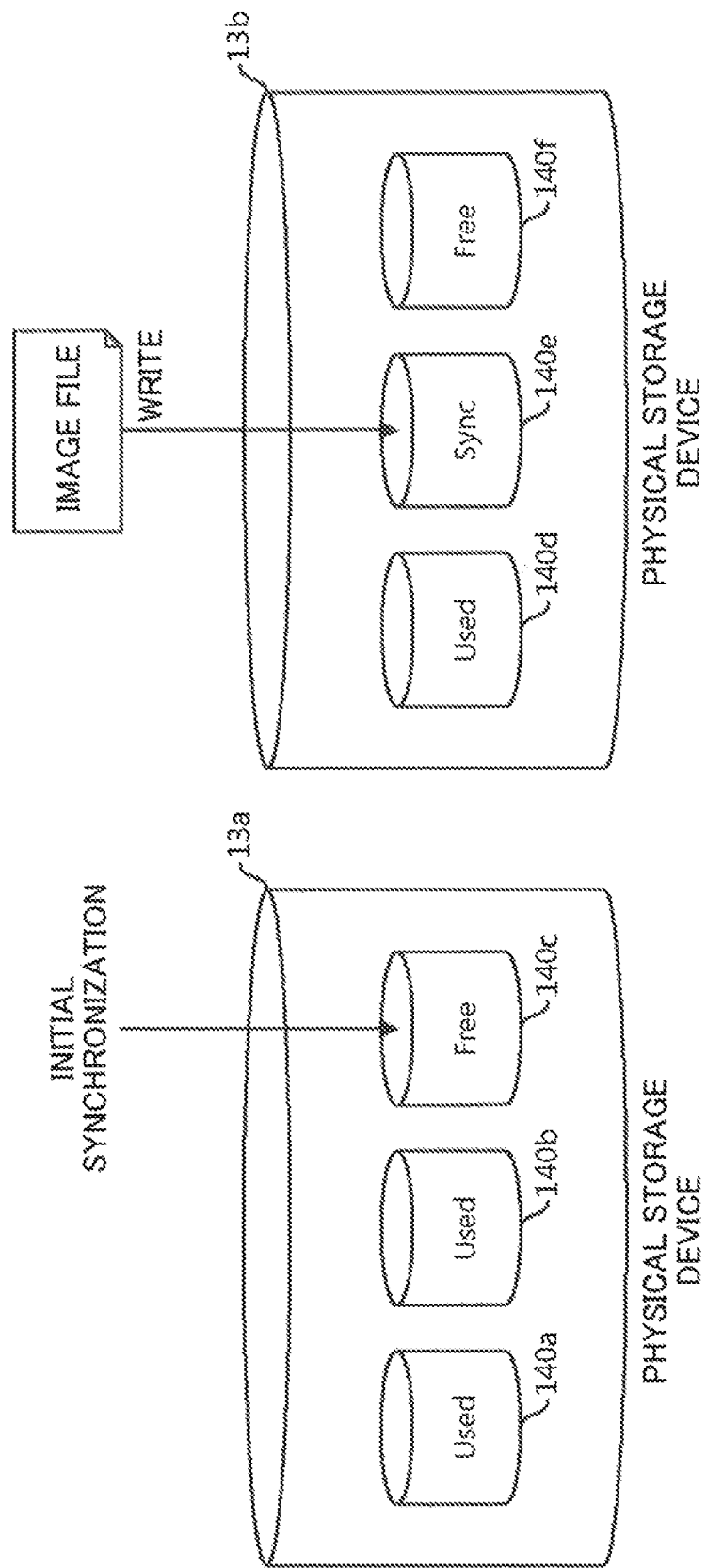

Subsequently, the statuses of the divided areas change, as illustrated in FIG. 16. In FIG. 16, the statuses of the divided areas 140a, 140b, 140c, 140d, 140e, and 140f are respectively "Used", "Used", "Free", "Used", "Sync", and "Free". In this case, the divided area 140e in the "Sync" state is allocated for storing an image file, and the image file is written to the divided area 140e. In parallel with the operation, the initial synchronization process is performed to the divided area 140c in the physical storage device 13a which is different from the physical storage device 13b to which the image file is being written.

Figure 17:
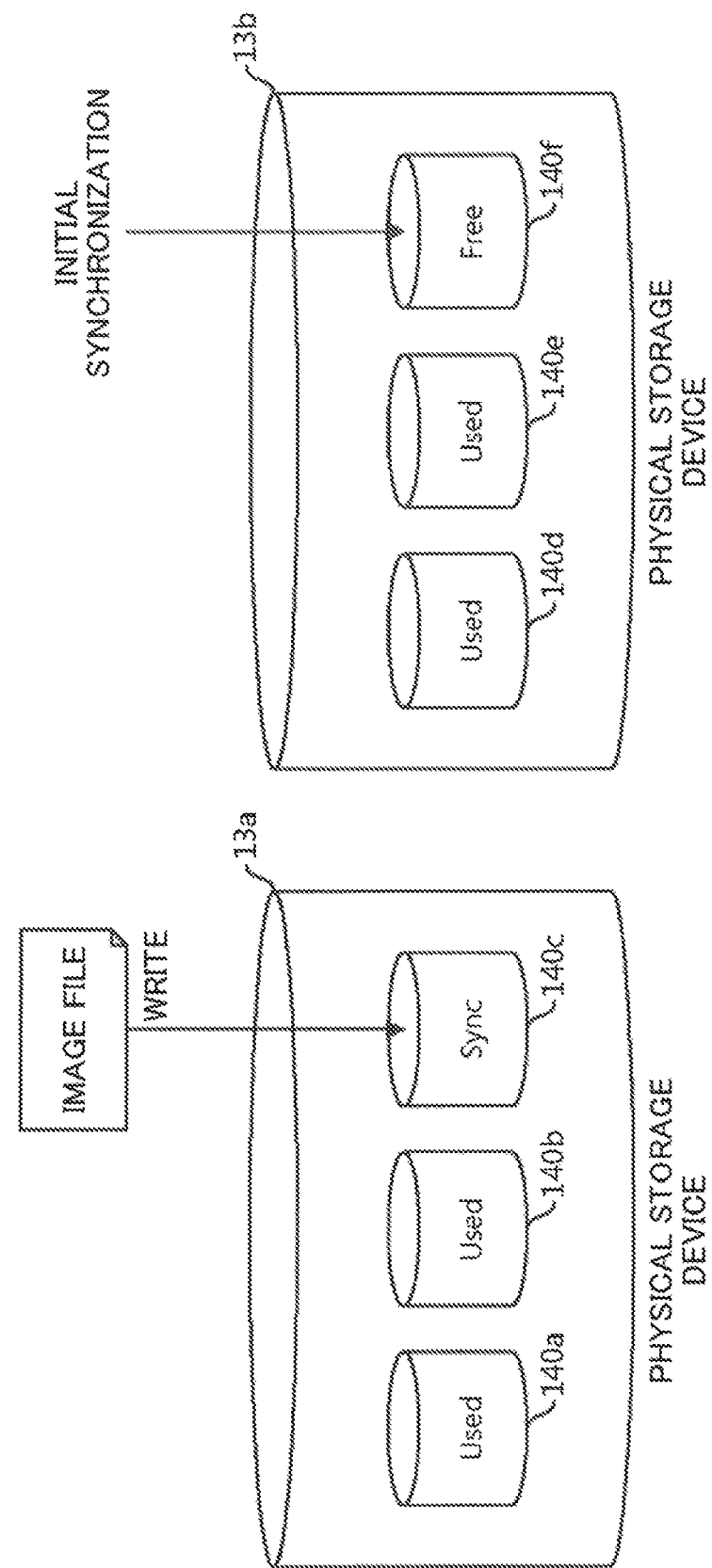

Subsequently, the statuses of the divided areas change, as illustrated in FIG. 17. In FIG. 17, the statuses of the divided areas 140a, 140b, 140c, 140d, 140e, and 140f are respectively "Used", "Used", "Sync", "Used", "Used", and "Free". In this case, the divided area 140c in the "Sync" state is allocated for storing an image file, and the image file is written to the divided area 140c. In parallel with the operation, the initial synchronization process is performed to the divided area 140f in the physical storage device 13b which is different from the physical storage device 13a to which the image file is being written.

Figure 18:
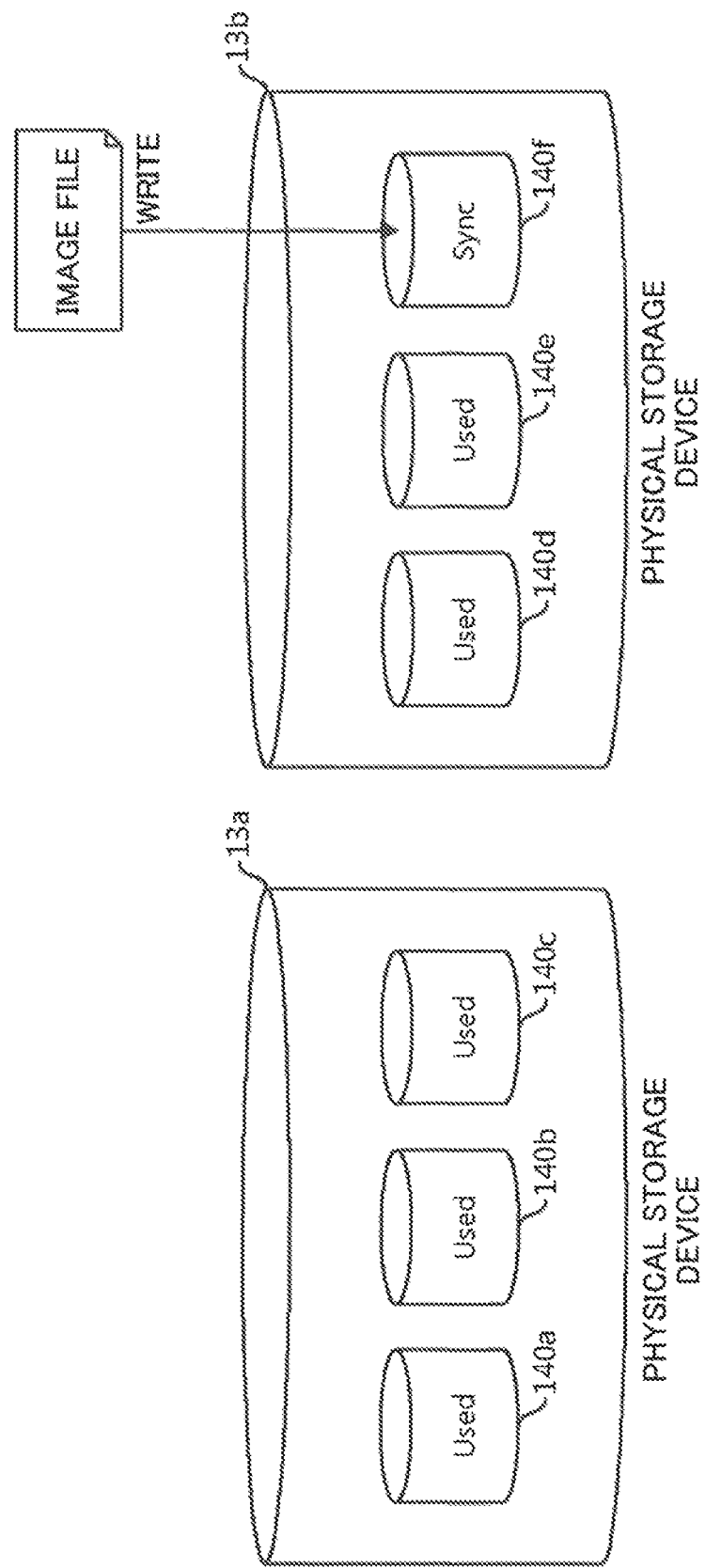

Subsequently, the statuses of the divided areas change, as illustrated in FIG. 18. In FIG. 18, the statuses of the divided areas 140a, 140b, 140c, 140d, 140e, and 140f are respectively "Used", "Used", "Used", "Used", "Used", and "Sync". In this case, the divided area 140f in the "Sync" state is allocated for storing an image file, and the image file is written to the divided area 140f. The writing of an image file and the initial synchronization process are executed as described above.

Figure 19:
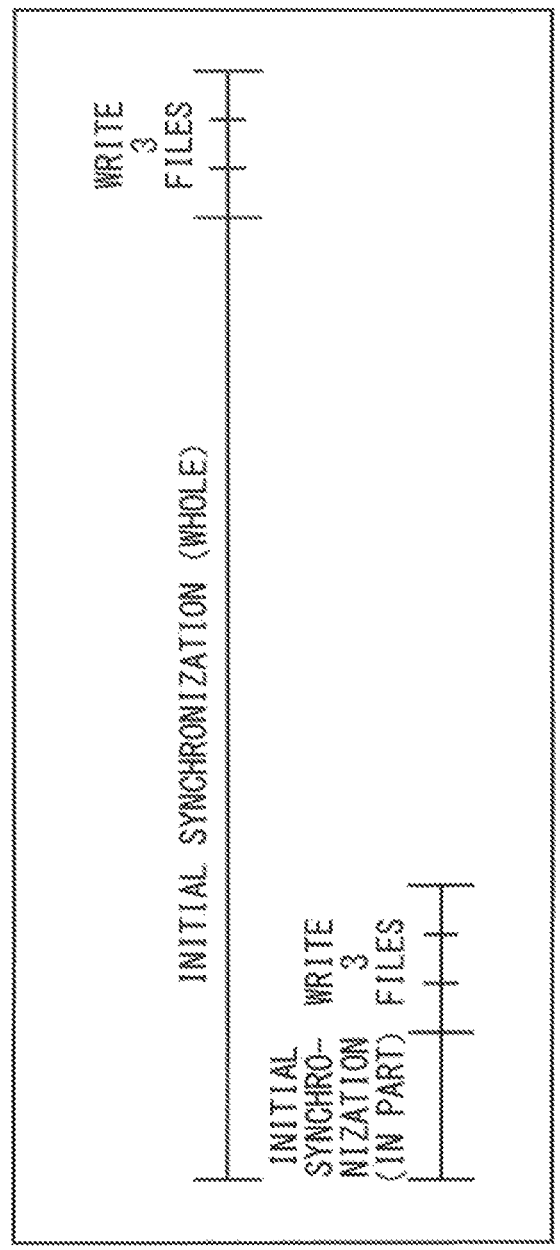
FIG. 19 is a diagram illustrating an effect of the present embodiment in which a time for initial synchronization is shortened.

FIG. 19 is a diagram illustrating an effect of the present embodiment in which a time for initial synchronization is shortened. An upper portion of FIG. 19 illustrates a time required for completing writing of an image file in a case in which the processes according to the present embodiment are not executed, and a lower portion of FIG. 19 illustrates a time required for completing writing of an image file in a case in which the processes according to the present embodiment are executed. Also, FIG. 19 illustrates a case in which three image files are written. As illustrated in FIG. 19, in the present embodiment, the initial synchronization process is made to only a part of the divided areas, not to an entire region of the physical storage device 13. Accordingly, a time required for the initial synchronization will be shortened. Further, even if the initial synchronization process is made to only a part of the divided areas, all the three image files can be stored.

Figure 20:
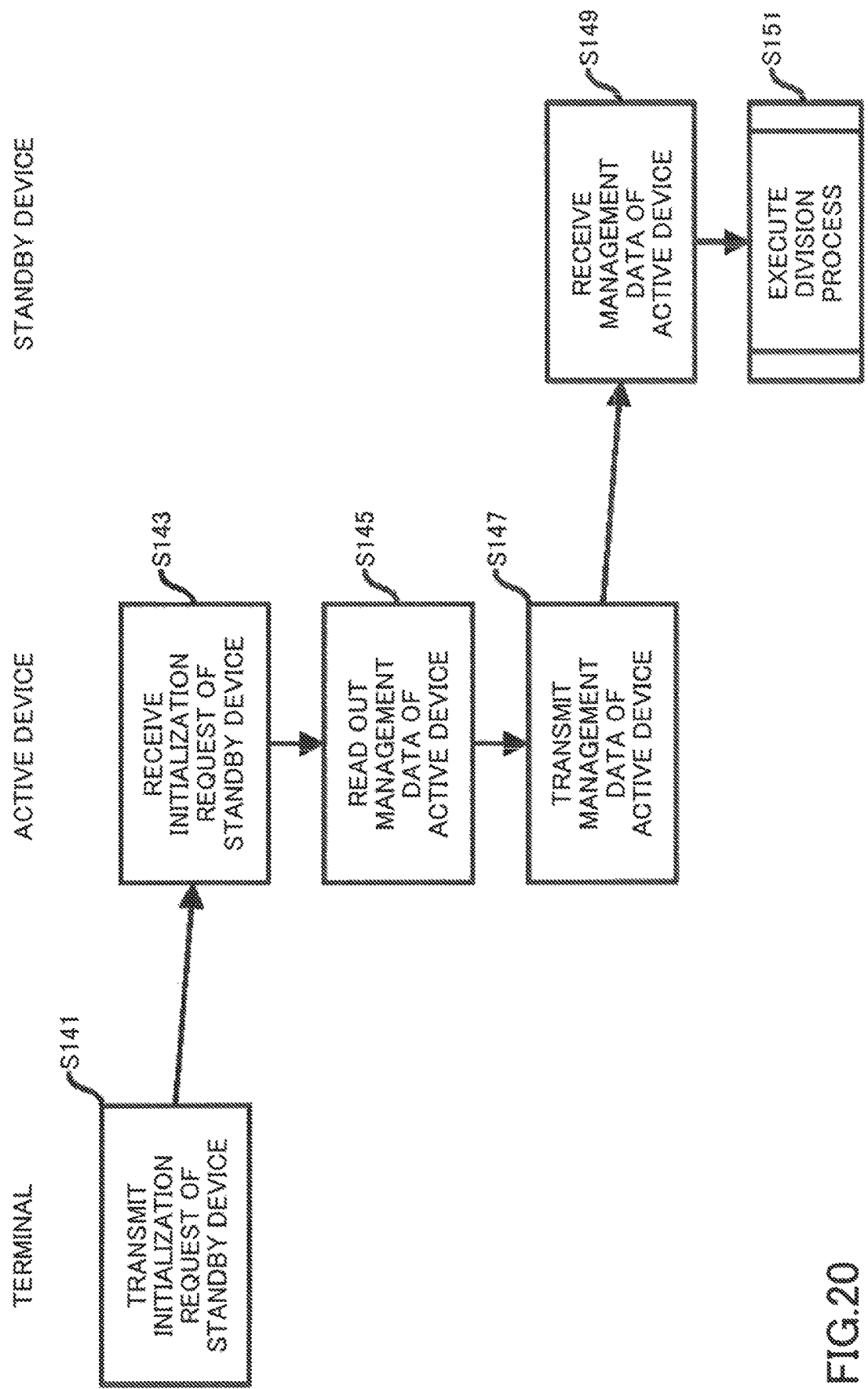
FIG. 20 is a flowchart illustrating a flow of a process performed, when a standby device takes over a task of a failed active device, and then a replacement information processing device for the failed active device starts an operation as a new standby device.

FIG. 20 is a flowchart illustrating a flow of a process performed, when a standby device takes over a task of a failed active device, and then a replacement information processing device for the failed active device starts an operation as a new standby device. Let the information processing device 1b be an active device that has taken over a task of a failed active device, and let the information processing device 1a be a new standby device (hereinafter, it will be simply referred to as a "standby device").

In response to an input from, for example, the system administrator, the terminal 3 transmits an initialization request of the standby device to the active device (FIG. 20: step S141).

The disk control unit 113 in the active device receives the initialization request of the standby device from the terminal 3 (step S143), and reads management data of the active device from the management data storage unit 120 (step S145).

The disk control unit 113 in the active device transmits the management data that was read out at step S145 to the standby device (step S147).

The disk control unit 113 in the standby device receives the management data from the active device (step S149), and executes the division process in accordance with the received management data (step S151). As the division process has already been described above, the description of the division process will be omitted.

By performing the above process, multiple divided areas can be configured in an information processing device that will be operated as a new standby device.

Figure 21:
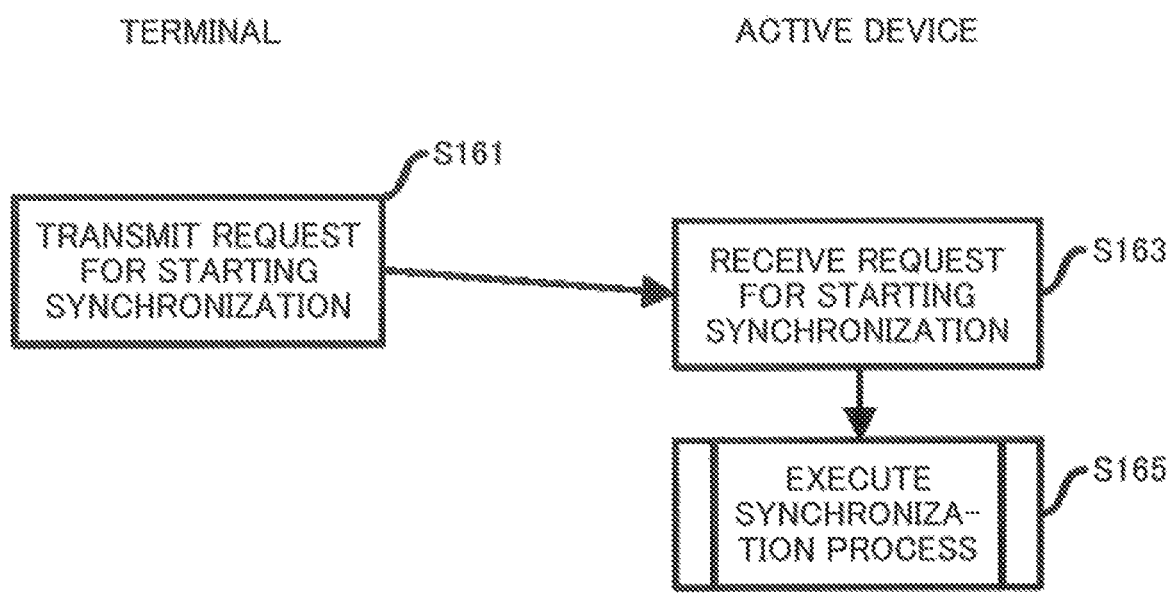
FIG. 21 is a flowchart illustrating a flow of a process performed when synchronization is performed in the standby device after a configuration of divided areas is completed.

FIG. 21 is a flowchart illustrating a flow of a process performed when synchronization is performed in the standby device after a configuration of divided areas is completed.

In response to an input from, for example, the system administrator, the terminal 3 transmits a request for starting synchronization to the active device (FIG. 21: step S161).

The disk control unit 113 in the active device receives the request for starting synchronization from the terminal 3 (step S163), and executes a synchronization process (step S165).

Figure 22:
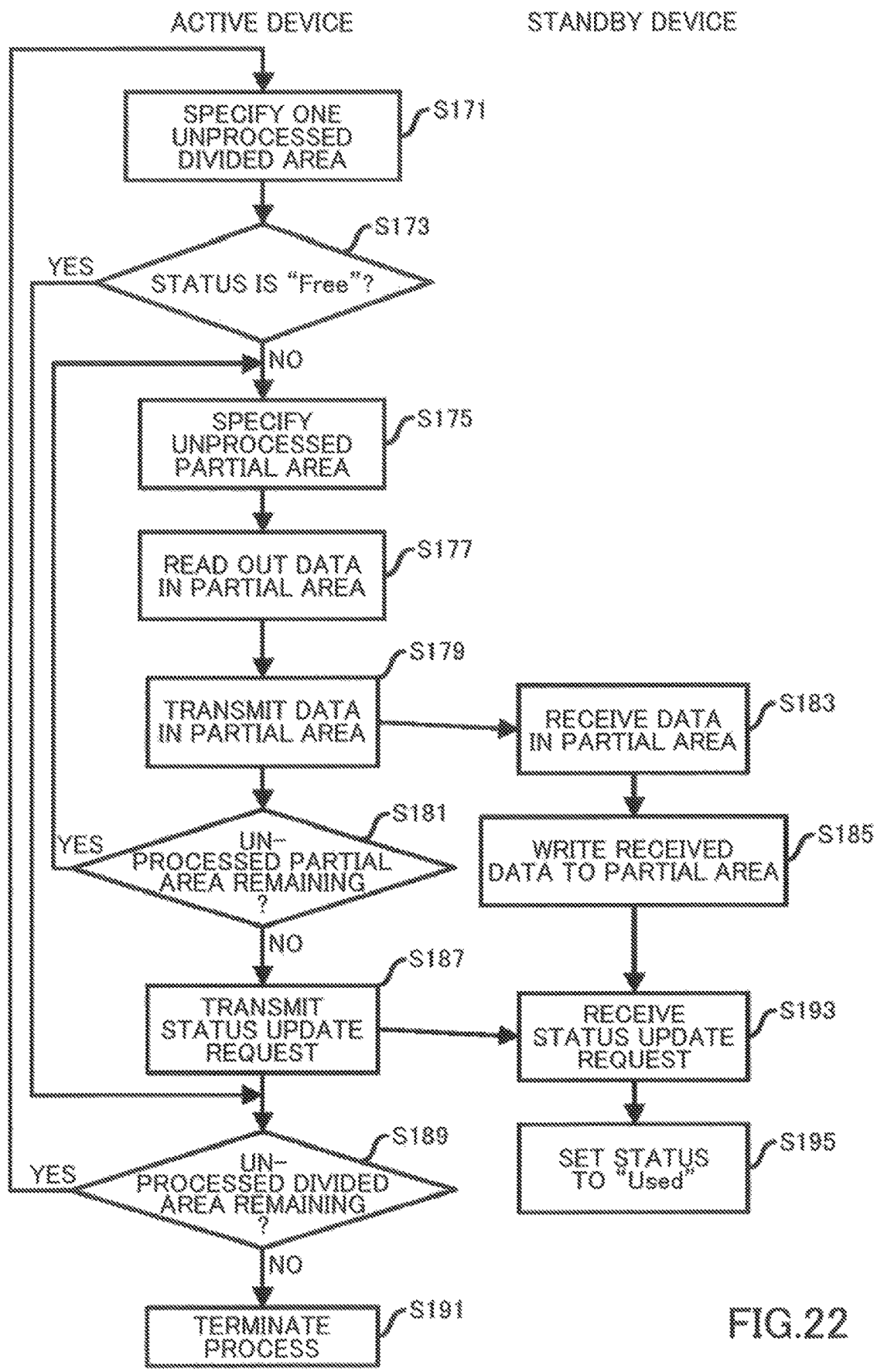
FIG. 22 is a flowchart illustrating a flow of a synchronization process.

FIG. 22 is a flowchart illustrating a flow of the synchronization process.

The disk control unit 113 in the active device instructs the synchronization management unit 111 in the active device to start synchronization. In response to the instruction, the synchronization management unit 111 in the active device specifies one divided area to which the following process (step S173 and thereafter) has not been applied (FIG. 22: step S171). During the description of the synchronization process, a divided area to which the following process has not been applied is referred to as an "unprocessed divided area".

The synchronization management unit 111 in the active device determines if the divided area specified at step S171 is in a "Free" state (step S173).

If the divided area is in a "Free" state (step S173: YES), it means that data to be synchronized is not stored in the divided area. Accordingly, the process proceeds to step S189.

If the divided area is not in a "Free" state (step S173: NO), the disk control unit 113 in the active device specifies, from the divided area specified at step S171, a partial area to which the following process (step S177 and step S179) has not been applied (unprocessed partial area) (step S175). The partial area is an area of a predetermined size smaller than a size of a divided area.

The first synchronization module 1121 in the active device reads out data in the partial area specified at step S175 (step S177). Subsequently, the first synchronization module 1121 in the active device transmits the data which was read out at step S177 to the first synchronization module 1121 in the standby device (step S179).

The first synchronization module 1121 in the active device determines if an unprocessed partial area still remains (step S181). If an unprocessed partial area remains (step S181: YES), the process reverts to step S175. If an unprocessed partial area is not present (step S181: NO), the process proceeds to step S187.

The first synchronization module 1121 in the standby device receives the data in the partial area specified at step S175 from the first synchronization module 1121 in the active device (step S183).

The first synchronization module 1121 in the standby device writes the data received at step S183 to a partial area corresponding to the partial area specified at step S175 (step S185).

The synchronization management unit 111 in the active device transmits a request for updating a status of the divided area specified at step S171 to the synchronization management unit 111 in the standby device (step S187).

The synchronization management unit 111 in the active device determines if an unprocessed divided area is still present (step S189). If an unprocessed divided area remains (step S189: YES), the process reverts to step S171. If an unprocessed divided area is not present (step S189: NO), the process terminates (step S191).

The synchronization management unit 111 in the standby device receives the request for updating the status of the divided area specified at step S171 from the active device (step S193).

The synchronization management unit 111 in the standby device sets a status of a divided area corresponding to the divided area specified at step S171 to "Used" (step S193).

By performing the above process, the synchronization can be made to only a part of the divided areas (the divided areas whose status is not "Free"), not to all the divided areas.

Figure 23:
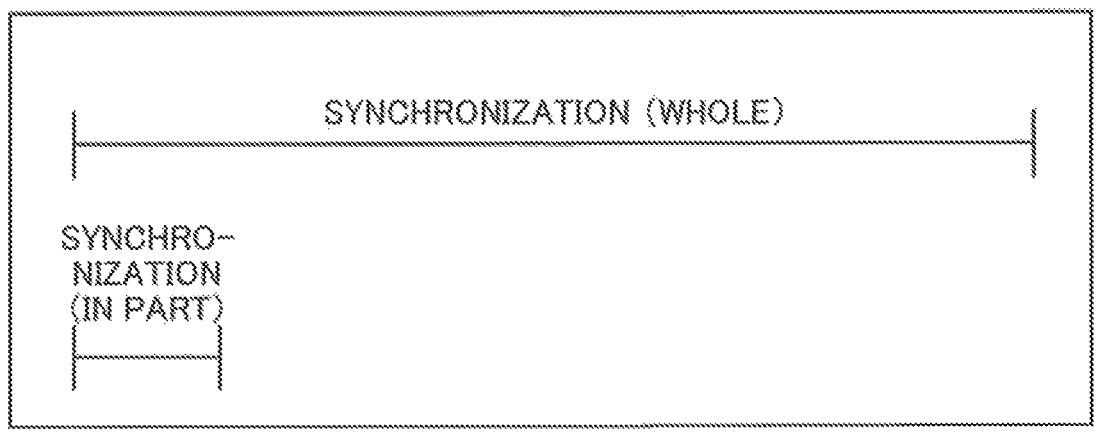
FIG. 23 is a diagram illustrating an effect of the present embodiment in which a time for synchronization when recovering from a failure is shortened.

FIG. 23 is a diagram illustrating an effect of the present embodiment in which a time for synchronization when recovering from a failure is shortened. An upper portion of FIG. 23 illustrates a time required for completing the synchronization in a case in which the processes according to the present embodiment are not executed, and a lower portion of FIG. 23 illustrates a time required for completing the synchronization in a case in which the processes according to the present embodiment are executed. As illustrated in FIG. 23, in the present embodiment, the synchronization processing is made to only a part of the divided areas, not to an entire region of the physical storage device 13. Accordingly, because a time required for the synchronization will be shortened, a time for recovering from a failure and returning to a state in which an operation can be started normally can be shortened.

Although the embodiment of the present invention has been described above, the present invention is not limited to the above described embodiment. For example, the functional blocks configuration of the information processing device 1a may be different from an actual program modules configuration.

With respect to the process flows, an execution order of each step may be changed, if a processing result is not changed. Also, each step may be executed in parallel.

A size of each divided region may be the same. Alternatively, each divided region may be configured to have a different size.

Further, when performing initial synchronization, initialization data for a partial area is not required to be transmitted, but only an initial synchronization request for the partial area may be transmitted to a standby device. In this case, the standby device performs the initial synchronization of the partial area by using initialization data retained in the standby device in advance.

Figure 24:
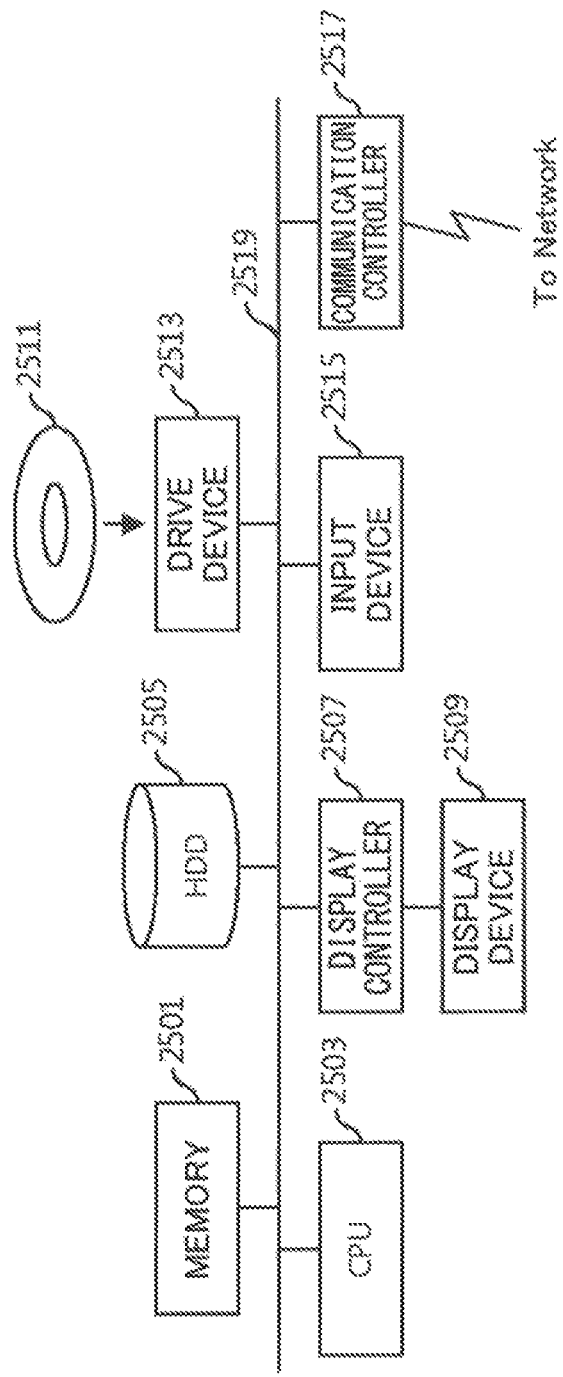
FIG. 24 is a hardware configuration diagram of a computing device.

The above mentioned terminal 3 is a computing device, as illustrated in FIG. 24. The terminal 3 (computing device) includes a memory 2501, a CPU 2503, an HDD 2505, a display controller 2507 connected to a display device 2509, a drive device 2513 for a removable disk 2511, an input device 2515, and a communication controller 2517, each of which is interconnected via a bus 2519. The HDD 2505 stores an operating system (OS) and an application program for performing processes according to the present embodiment. When these programs are to be executed by the CPU 2503, these programs are loaded from the HDD 2505 onto the memory 2501. In accordance with the application program, the CPU 2503 controls the display controller 2507, the communication controller 2517, or the drive device 2513, to perform a predetermined operation. Data which is being processed is mainly stored into the memory 2501, but the data may be stored into the HDD 2505. The application program for performing the above described processes is distributed in a state stored in the computer readable removable disk 2511, and is installed into the HDD 2505 via the drive device 2513. Alternatively, the application program may be installed into the HDD 2505, via a network such as the Internet and the communication controller 2517. The computing device mentioned here embodies the above mentioned various functions by organic cooperation of hardware, such as the above mentioned CPU 2503 or memory 2501, and software, such as the above mentioned OS or application program.

The above mentioned embodiment of the present embodiment will be summarized in the following.

An information processing device according to a first aspect of the present embodiment includes: (A) a configuration unit configured to perform a configuration of dividing one or more physical storage devices in the information processing device into multiple storage areas (the synchronization management unit 111 in the present embodiment is an example of the configuration unit), (B) a first synchronization unit configured to initialize at least one of the storage areas and to synchronize data stored in the initialized storage area with another information processing device (the first synchronization module 1121 in the present embodiment is an example of the first synchronization unit), and (C) a second synchronization unit configured to write file data, used for generating a virtual machine, to the one of the storage areas, and to synchronize the file data written to the one of the storage areas with the another information processing device.

Because synchronization processing is made to only a part of the storage areas, not to an entire region, a time for the synchronization processing that is performed when an operation of a system having a redundant configuration is started can be shortened.

The information processing device may include the multiple physical storage devices. Also, the first synchronization unit may, (b1) while the second synchronization unit is writing the file data to a first physical storage device in the multiple physical storage devices, initialize an uninitialized storage area in a second physical storage device in the multiple physical storage devices, and synchronize data stored in the initialized storage area with the another information processing device.

Because a time for the synchronization processing is not required to be provided separately, a time to configure a system such that an operation of the system can be started can be shortened.

The first synchronization unit may, (b2) in a case in which a total size of the storage areas initialized and synchronized by the first synchronization unit is less than a size of the file data, repeat a process for initializing an uninitialized storage area and for synchronizing data stored in the initialized storage area with the another information processing device, until the total size of the storage areas initialized and synchronized by the first synchronization unit exceeds the size of the file data.

According to the information processing device, an increase of a time to configure a system such that an operation of the system can be started can be prevented.

The information processing device may further include (D) a transmitting unit configured to transmit information about a division of the physical storage device to a replacement information processing device which replaces another information processing device when the another information processing device fails. Also, the first synchronization unit may (c1) synchronize data written to the one of the storage areas with the replacement information processing device.

By performing the above process, in new alternate information processing device introduced because of occurrence of failure in the another information processing device, a time to configure the alternate information processing device such that an operation of a virtual machine can be started can be shortened.

An information processing system according to a second aspect of the present embodiment includes (E) a first information processing device (the information processing device 1a in the present embodiment is an example of the first information processing device) and (F) a second information processing device (the information processing device 1b in the present embodiment is an example of the second information processing device). The first information processing device includes: (e1) a configuration unit configured to perform a configuration of dividing a physical storage device in the information processing device into multiple storage areas (the synchronization management unit 111 in the present embodiment is an example of the configuration unit), (e2) a first synchronization unit configured to initialize at least one of the storage areas and to synchronize data stored in the initialized storage area with another information processing device (the first synchronization module 1121 in the present embodiment is an example of the first synchronization unit), and (e3) a second synchronization unit configured to write file data, used for generating a virtual machine, to the one of the storage areas, and to synchronize the file data written to the one of the storage areas with another information processing device (the second synchronization module 1122 in the present embodiment is an example of the second synchronization unit).

An information processing method according to a third aspect of the present embodiment includes: (G) performing a configuration of dividing a physical storage device in the information processing device into multiple storage areas, (H) initializing at least one of the storage areas and synchronizing data stored in the initialized storage area with another information processing device, and (I) writing file data, used for generating a virtual machine, to the one of the storage areas, and synchronizing the file data written to the one of the storage areas with another information processing device.

Note that a program for causing a processor to execute the above method can be created. The program is stored into a computer-readable storage medium (or storage device) such as a flexible disk, a CD-ROM, a magneto-optical disk, a semiconductor memory, or a hard disk drive. Note that an intermediate processing result may be temporarily stored in a memory device such as a main memory.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing system comprising:
a first information processing device including a first processor and a plurality of physical storage devices including a first physical storage device and a second physical storage device;
a second information processing device including a second processor and a third physical storage device, the second information processing device being connected to the first information processing device via a network; and
a third information processing device including a third processor and a fourth physical storage device, the third information processing device being connected to the second information processing device via the network;
the first processor being configured to execute
a configuration process of configuring a plurality of storage areas by dividing each of the plurality of physical storage devices;
a first synchronization process of initializing at least a first storage area among the storage areas in the first information processing device and of synchronizing the first storage area with a second storage area in the third physical storage device of the second information processing device, by writing initialization data into both the first storage area in the first information processing device and the second storage area in the second information processing device; and
a second synchronization process of synchronizing the first storage area in the first information processing device with the second storage area in the second information processing device, by writing file data used for generating a virtual machine to both the first storage area in the first information processing device and the second storage area in the second information processing device after the first storage area and the second storage area are initialized and synchronized by the first synchronization process; and
the second processor being configured to, after a failure of the first information processing device, synchronize storage areas in the third physical storage device with storage areas in the fourth physical storage device of the third information processing device, by copying data in the storage areas in the third physical storage device of the second information processing device into the storage areas in the fourth physical storage device of the third information processing device; wherein
while the second synchronization process is writing the file data to the first storage area of the first physical storage device in the first information processing device, the first synchronization process simultaneously initializes a third storage area of the second physical storage device in the first information processing device, and synchronizes the third storage area with a fourth storage area in the second information processing device.

2. The information processing system according to claim 1, wherein, in a case in which a total size of the storage areas initialized and synchronized is less than a size of the file data, the first synchronization process is executed repeatedly to initialize and synchronize an uninitialized storage area, until the total size of the storage areas initialized and synchronized by the first synchronization process exceeds the size of the file data.

3. The information processing system according to claim 1, wherein, after the failure of the first information processing device, only storage areas in the third physical storage device that have been synchronized by the first synchronization process are synchronized with the storage areas in the fourth physical storage device of the third information processing device.

4. A non-transitory computer-readable recording medium storing a computer program to be executed by an information processing system including a first information processing device, a second information processing device connected to the first information processing device via a network, and a third information processing device connected to the second information processing device via the network, the first information processing device including a first processor and a plurality of physical storage devices including a first physical storage device and a second physical storage device, the second information processing device including a second processor and a third physical storage device, the third information processing device including a third processor and a fourth physical storage device, the computer program being configured to cause the information processing system to perform a method comprising:

(a) configuring, by the first processor, a plurality of storage areas by dividing each of the plurality of physical storage devices in the first information processing device;

(b) performing, by the first processor, an initialization of at least a first storage area among the storage areas in the first information processing device and synchronization of the first storage area with a second storage area in the third physical storage device of the second information processing device, by writing initialization data into both the first storage area in the first information processing device and the second storage area in the second information processing device;

(c) performing, by the first processor, a writing of file data used for generating a virtual machine to both the first storage area in the first information processing device and the second storage area in the second information processing device after step (b); and (d) after a failure of the first information processing device, by the second processor, synchronizing storage areas in the third physical storage device with storage areas in the fourth physical storage device of the third information processing device, by copying data in the storage areas in the third physical storage device of the second information processing device into the storage areas in the fourth physical storage device of the third information processing device; wherein while the file data is written to the first storage area of the first physical storage device in the first information processing device in step (c), a third storage area of the second physical storage device is simultaneously initialized and the third storage area is synchronized with a fourth storage area in the second information processing device in step (b).

5. The non-transitory computer-readable recording medium according to claim 4, wherein, in a case in which a total size of the storage areas initialized and synchronized is less than a size of the file data, step (b) is executed repeatedly to initialize and synchronize an uninitialized storage area, until the total size of the storage areas initialized and synchronized in step (b) exceeds the size of the file data.

6. The non-transitory computer-readable recording medium according to claim 4, wherein, after the failure of the first information processing device, only storage areas in the third physical storage device that have been synchronized by the first synchronization process are synchronized with the storage areas in the fourth physical storage device of the third information processing device.

* * * * *